(12) United States Patent
Stafford et al.

(10) Patent No.: US 11,540,148 B2
(45) Date of Patent: Dec. 27, 2022

(54) METHODS AND APPARATUS FOR ACCESS POINT LOCATION

(71) Applicant: Time Warner Cable Enterprises LLC, New York, NY (US)

(72) Inventors: Roger Stafford, Broomfield, CO (US); Eduardo Cardona, Broomfield, CO (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 512 days.

(21) Appl. No.: 14/302,313

(22) Filed: Jun. 11, 2014

(65) Prior Publication Data

US 2015/0365833 A1   Dec. 17, 2015

(51) Int. Cl.
| | |
|---|---|
| *H04L 43/00* | (2022.01) |
| *H04W 24/02* | (2009.01) |
| *H04W 16/20* | (2009.01) |
| H04W 88/08 | (2009.01) |
| H04W 84/12 | (2009.01) |

(52) U.S. Cl.
CPC .......... *H04W 24/02* (2013.01); *H04W 16/20* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,313,454 | A | 5/1994 | Bustini et al. |
| 5,369,707 | A | 11/1994 | Follendore, III |
| 5,528,284 | A | 6/1996 | Iwami et al. |
| 5,577,209 | A | 11/1996 | Boyle et al. |

(Continued)

FOREIGN PATENT DOCUMENTS

| | | |
|---|---|---|
| EP | 1139198 A2 | 10/2001 |
| EP | 2113860 A1 | 11/2009 |

(Continued)

OTHER PUBLICATIONS

Deering et al., Internet Protocol, Version 6 (Ipv6) Specification, IETF RFC 2460 (Dec. 1998).

(Continued)

*Primary Examiner* — Willie J Daniel, Jr.
(74) *Attorney, Agent, or Firm* — Patent Beach PC

(57) ABSTRACT

Methods and apparatus for determining a desired or optimal location for one or more access points within a premises. In one embodiment, software is provided to wireless-enabled client devices in a user premises; the software enables each of the devices to communicate with one another and collect a plurality of data relating to the connectivity of each at various locations within the premises. The data is used to determine a desired or optimal location for placement of an access point. Once the optimal location is determined, the access point is placed, and the client devices communicate therewith. In one variant, ongoing data may be collected as the system operates to ensure continued optimization. In the instance changes in the topology or environment of the user premises cause significant alterations to the communication signals or connectivity, a new optimal location for the access point may be determined.

20 Claims, 7 Drawing Sheets

(56) References Cited

U.S. PATENT DOCUMENTS

| | | |
|---|---|---|
| 5,708,961 A | 1/1998 | Hylton et al. |
| 5,715,403 A | 2/1998 | Stefik |
| 5,774,170 A | 6/1998 | Hite et al. |
| 5,787,172 A | 7/1998 | Arnold |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,897,635 A | 4/1999 | Torres et al. |
| 5,926,205 A | 7/1999 | Krause et al. |
| 5,935,206 A | 8/1999 | Dixon et al. |
| 5,982,412 A | 11/1999 | Nulty |
| 6,002,393 A | 12/1999 | Hite et al. |
| 6,009,103 A | 12/1999 | Woundy |
| 6,092,178 A | 7/2000 | Jindal et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,169,728 B1 | 1/2001 | Perreault et al. |
| 6,181,697 B1 | 1/2001 | Nurenberg et al. |
| 6,211,901 B1 | 4/2001 | Imajima et al. |
| 6,212,636 B1 | 4/2001 | Boyle et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,553 B1 | 5/2001 | Son et al. |
| 6,249,680 B1 | 6/2001 | Wax et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,353,626 B1 | 3/2002 | Sunay et al. |
| 6,359,711 B1 | 3/2002 | Cole et al. |
| 6,378,130 B1 | 4/2002 | Adams |
| 6,434,141 B1 | 8/2002 | Oz et al. |
| 6,456,716 B1 | 9/2002 | Arnold |
| 6,463,585 B1 | 10/2002 | Hendricks et al. |
| 6,498,783 B1 | 12/2002 | Lin |
| 6,519,062 B1 | 2/2003 | Yoo |
| 6,523,696 B1 | 2/2003 | Saito et al. |
| 6,590,865 B1 | 7/2003 | Ibaraki et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,687,735 B1 | 2/2004 | Logston et al. |
| 6,694,145 B2 | 2/2004 | Riikonen et al. |
| 6,711,148 B1 * | 3/2004 | Hills .................. H04L 41/0823 370/338 |
| 6,718,551 B1 | 4/2004 | Swix et al. |
| 6,738,978 B1 | 5/2004 | Hendricks et al. |
| 6,742,116 B1 | 5/2004 | Matsui et al. |
| 6,760,768 B2 | 7/2004 | Holden et al. |
| 6,763,391 B1 | 7/2004 | Ludtke |
| 6,782,550 B1 | 8/2004 | Cao |
| 6,785,810 B1 | 8/2004 | Lirov et al. |
| 6,788,676 B2 | 9/2004 | Partanen et al. |
| 6,799,047 B1 * | 9/2004 | Bahl .................. G01C 21/206 455/456.1 |
| 6,807,573 B2 | 10/2004 | Saito et al. |
| 6,813,505 B2 | 11/2004 | Walley et al. |
| 6,842,783 B1 | 1/2005 | Boivie et al. |
| 6,859,535 B1 | 2/2005 | Tatebayashi et al. |
| 6,891,841 B2 | 5/2005 | Leatherbury et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | Demello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,072,950 B2 | 7/2006 | Toft |
| 7,073,199 B1 | 7/2006 | Raley |
| 7,075,945 B2 | 7/2006 | Arsenault et al. |
| 7,086,077 B2 | 8/2006 | Giammaressi |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,143,431 B1 | 11/2006 | Eager et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,242,960 B2 | 7/2007 | Van Rooyen et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,308,415 B2 | 12/2007 | Kimbrel et al. |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,334,044 B1 | 2/2008 | Allen |
| 7,340,759 B1 | 3/2008 | Rodriguez |
| 7,346,688 B2 | 3/2008 | Allen et al. |
| 7,353,543 B2 | 4/2008 | Ohmori et al. |
| 7,363,371 B2 | 4/2008 | Kirby et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,409,546 B2 | 8/2008 | Platt |
| 7,457,520 B2 | 11/2008 | Rosetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |
| 7,567,565 B2 | 7/2009 | La Joie |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,673,004 B1 | 3/2010 | Sherstinsky et al. |

(56) References Cited

U.S. PATENT DOCUMENTS

| | | |
|---|---|---|
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,860,507 B2 | 12/2010 | Kalika et al. |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,041,785 B2 | 10/2011 | Mazur et al. |
| 8,084,792 B2 | 12/2011 | Lehmann et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La Joie et al. |
| 8,306,634 B2 | 11/2012 | Nguyen et al. |
| 8,332,370 B2 | 12/2012 | Gattegno et al. |
| 8,341,242 B2 | 12/2012 | Dillon et al. |
| 8,380,226 B2 | 2/2013 | Clipsham |
| 8,442,265 B1 | 5/2013 | Bosworth et al. |
| 8,583,484 B1 | 11/2013 | Chalawsky et al. |
| 8,713,623 B2 | 4/2014 | Brooks |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,300,919 B2 | 3/2016 | Cholas et al. |
| 9,935,833 B2 | 4/2018 | McAllister |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0055978 A1* | 5/2002 | Joon-Bo ............... H04W 84/20 709/209 |
| 2002/0056125 A1 | 5/2002 | Hodge et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087976 A1 | 7/2002 | Kaplan et al. |
| 2002/0123928 A1 | 9/2002 | Eldering et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0002862 A1 | 1/2003 | Rodriguez et al. |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0021421 A1 | 1/2003 | Yokota et al. |
| 2003/0041336 A1 | 2/2003 | Del Sordo et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0069965 A1 | 4/2003 | Ma et al. |
| 2003/0071117 A1 | 4/2003 | Meade |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0099212 A1* | 5/2003 | Anjum .................. H04W 92/02 370/328 |
| 2003/0114162 A1 | 6/2003 | Chheda et al. |
| 2003/0115267 A1 | 6/2003 | Hinton et al. |
| 2003/0139980 A1 | 7/2003 | Hamilton |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019691 A1 | 1/2004 | Daymond et al. |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0106403 A1 | 6/2004 | Mori et al. |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |
| 2004/0146006 A1 | 7/2004 | Jackson |
| 2004/0166881 A1 | 8/2004 | Farchmin |
| 2004/0181800 A1 | 9/2004 | Rakib et al. |
| 2004/0187159 A1 | 9/2004 | Gaydos et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0240478 A1 | 12/2004 | Goren et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0007278 A1 | 1/2005 | Anson et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0065888 A1 | 3/2005 | Benaloh |
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0097006 A1 | 5/2005 | Nyako |
| 2005/0108763 A1 | 5/2005 | Baran et al. |

(56) References Cited

U.S. PATENT DOCUMENTS

| | | |
|---|---|---|
| 2005/0111844 A1 | 5/2005 | Compton et al. |
| 2005/0114686 A1 | 5/2005 | Ball et al. |
| 2005/0114900 A1 | 5/2005 | Ladd et al. |
| 2005/0125832 A1 | 6/2005 | Jost et al. |
| 2005/0138357 A1 | 6/2005 | Swenson et al. |
| 2005/0168323 A1 | 8/2005 | Lenoir et al. |
| 2005/0169468 A1 | 8/2005 | Fahrny et al. |
| 2005/0172127 A1 | 8/2005 | Hartung et al. |
| 2005/0176444 A1 | 8/2005 | Tanaka |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0154674 A1 | 7/2006 | Landschaft et al. |
| 2006/0161635 A1 | 7/2006 | Lamkin et al. |
| 2006/0165090 A1 | 7/2006 | Kalliola et al. |
| 2006/0165197 A1 | 7/2006 | Morita et al. |
| 2006/0168219 A1 | 7/2006 | Ahluwalia et al. |
| 2006/0171390 A1 | 8/2006 | La Joie |
| 2006/0171423 A1 | 8/2006 | Helms et al. |
| 2006/0179138 A1 | 8/2006 | Van Gassel et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0259927 A1 | 11/2006 | Acharya et al. |
| 2006/0277569 A1 | 12/2006 | Smith |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0076696 A1 | 4/2007 | An et al. |
| 2007/0076728 A1 | 4/2007 | Rieger et al. |
| 2007/0079381 A1 | 4/2007 | Hartung et al. |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0113243 A1 | 5/2007 | Brey |
| 2007/0115900 A1 | 5/2007 | Liang et al. |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0195727 A1 | 8/2007 | Kinder et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0233857 A1 | 10/2007 | Cheng et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0266395 A1 | 11/2007 | Lee et al. |
| 2007/0276925 A1 | 11/2007 | La Joie et al. |
| 2007/0276926 A1 | 11/2007 | LaJoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0037493 A1 | 2/2008 | Morton |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0101460 A1 | 5/2008 | Rodriguez |
| 2008/0103976 A1 | 5/2008 | Read et al. |
| 2008/0103977 A1 | 5/2008 | Khosravy et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0148362 A1 | 6/2008 | Gilder et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0212945 A1 | 9/2008 | Khedouri et al. |
| 2008/0222684 A1 | 9/2008 | Mukraj et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0025027 A1 | 1/2009 | Craner |
| 2009/0025075 A1 | 1/2009 | Chow et al. |
| 2009/0028182 A1 | 1/2009 | Brooks et al. |
| 2009/0031371 A1 | 1/2009 | Munsell et al. |
| 2009/0064251 A1 | 3/2009 | Savoor et al. |
| 2009/0083813 A1 | 3/2009 | Dolce et al. |
| 2009/0094648 A1 | 4/2009 | Patel et al. |
| 2009/0098861 A1 | 4/2009 | Kalliola et al. |
| 2009/0100459 A1 | 4/2009 | Riedl et al. |
| 2009/0102983 A1 | 4/2009 | Malone et al. |

(56) References Cited

U.S. PATENT DOCUMENTS

| | | |
|---|---|---|
| 2009/0125374 A1 | 5/2009 | Deaton et al. |
| 2009/0151006 A1 | 6/2009 | Saeki et al. |
| 2009/0170479 A1 | 7/2009 | Jarenskog |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0244290 A1 | 10/2009 | Mckelvey et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0292922 A1 | 11/2009 | Park |
| 2009/0293101 A1 | 11/2009 | Carter et al. |
| 2010/0014496 A1* | 1/2010 | Kalika ............... H04L 12/2456 370/338 |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0070867 A1 | 3/2010 | Lemmers |
| 2010/0081416 A1 | 4/2010 | Cohen |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0122288 A1 | 5/2010 | Minter et al. |
| 2010/0131973 A1 | 5/2010 | Dillon et al. |
| 2010/0138900 A1 | 6/2010 | Peterka et al. |
| 2010/0150027 A1* | 6/2010 | Atwal ............... H04W 16/18 370/254 |
| 2010/0151816 A1 | 6/2010 | Besehanic et al. |
| 2010/0159951 A1 | 6/2010 | Shkedi |
| 2010/0167743 A1 | 7/2010 | Palanki et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0309051 A1 | 12/2010 | Moshfeghi |
| 2010/0312826 A1 | 12/2010 | Sarosi et al. |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0138064 A1 | 6/2011 | Rieger et al. |
| 2011/0163888 A1 | 7/2011 | Goedde |
| 2011/0164753 A1 | 7/2011 | Dubhashi et al. |
| 2011/0167440 A1 | 7/2011 | Greenfield |
| 2011/0169977 A1 | 7/2011 | Masuda |
| 2011/0197070 A1 | 8/2011 | Mizrah |
| 2011/0206136 A1 | 8/2011 | Bekedam et al. |
| 2011/0213688 A1 | 9/2011 | Santos et al. |
| 2011/0219229 A1 | 9/2011 | Cholas et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0252236 A1 | 10/2011 | De Atley et al. |
| 2011/0252243 A1 | 10/2011 | Brouwer et al. |
| 2011/0286437 A1 | 11/2011 | Austin et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079531 A1 | 3/2012 | Hasek et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0203822 A1 | 8/2012 | Floyd et al. |
| 2012/0203853 A1 | 8/2012 | Davis et al. |
| 2012/0222081 A1 | 8/2012 | Schaefer et al. |
| 2012/0291062 A1 | 11/2012 | Pearson et al. |
| 2012/0302259 A1 | 11/2012 | Busch |
| 2012/0330759 A1 | 12/2012 | Aggarwal et al. |
| 2013/0016648 A1 | 1/2013 | Koskela et al. |
| 2013/0023247 A1 | 1/2013 | Bolon et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1 | 4/2013 | Gold et al. |
| 2013/0100818 A1* | 4/2013 | Qiu ............... H04L 45/122 370/238 |
| 2013/0132789 A1 | 5/2013 | Watford et al. |
| 2013/0145152 A1 | 6/2013 | Maino et al. |
| 2013/0235774 A1 | 9/2013 | Jo et al. |
| 2013/0254787 A1 | 9/2013 | Cox et al. |
| 2013/0308622 A1 | 11/2013 | Uhlik |
| 2013/0317892 A1 | 11/2013 | Heerboth |
| 2013/0347089 A1 | 12/2013 | Bailey et al. |
| 2014/0010219 A1 | 1/2014 | Dor et al. |
| 2014/0046624 A1 | 2/2014 | Miettinen |
| 2014/0066098 A1 | 3/2014 | Stern et al. |
| 2014/0177611 A1 | 6/2014 | Corrales |
| 2014/0213256 A1 | 7/2014 | Meylan et al. |
| 2014/0215506 A1 | 7/2014 | Kalmes et al. |
| 2014/0242991 A1 | 8/2014 | Yanover et al. |
| 2014/0274110 A1 | 9/2014 | Mehta et al. |
| 2014/0281489 A1 | 9/2014 | Peterka et al. |
| 2014/0282721 A1 | 9/2014 | Kuncl et al. |
| 2014/0283137 A1 | 9/2014 | Rebaud et al. |
| 2014/0309868 A1 | 10/2014 | Ricci |
| 2014/0328257 A1 | 11/2014 | Kamlani |
| 2014/0359649 A1 | 12/2014 | Cronk et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1* | 4/2015 | Butchko ............... H04L 43/50 370/252 |
| 2015/0106501 A1 | 4/2015 | Malets et al. |
| 2015/0106846 A1 | 4/2015 | Chen et al. |
| 2015/0146537 A1 | 5/2015 | Panaitopol et al. |
| 2015/0156129 A1 | 6/2015 | Tsuruoka |
| 2015/0189377 A1 | 7/2015 | Wheatley et al. |
| 2015/0288617 A1 | 10/2015 | Dasher et al. |
| 2015/0288732 A1 | 10/2015 | Phillips et al. |
| 2015/0365833 A1 | 12/2015 | Stafford et al. |
| 2016/0019103 A1 | 1/2016 | Basra |
| 2016/0066234 A1 | 3/2016 | Cho et al. |
| 2016/0127185 A1 | 5/2016 | Mcallister |
| 2016/0301525 A1 | 10/2016 | Canard et al. |

FOREIGN PATENT DOCUMENTS

| | | |
|---|---|---|
| GB | 2381709 A | 5/2003 |
| JP | H08263440 A | 10/1996 |
| JP | 2000156676 A | 6/2000 |
| JP | 2000332746 A | 11/2000 |
| JP | 2001243707 A | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |

(56) References Cited

FOREIGN PATENT DOCUMENTS

| | | |
|---|---|---|
| JP | 2004120736 A | 4/2004 |
| JP | 2004120738 A | 4/2004 |
| JP | 2004303111 A | 10/2004 |
| JP | 2005506627 A | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2006020141 A2 | 2/2006 |
| WO | WO-2008080556 A1 | 7/2008 |
| WO | WO-2009020476 A2 | 2/2009 |
| WO | WO-2012021245 A1 | 2/2012 |

OTHER PUBLICATIONS

Internet Protocol DARPA Internet Program Protocol Specification, IETF RFC 791 (Sep. 1981).
5C Digital Transmission Content Protection White Paper, Hitachi, Ltd., et al., dated Jul. 14, 1998, 15 pages.
Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.Org/securit/saml/v2.0/saml-core-2.0-os.pdf).
Cantor, et al., Bindings for the OASIS Security Assertion Markup Language (SAML) V2.0, OASIS Standard, Mar. 2005 (http://docs.oasis-open.org/security/saml/v2.0/).
Cisco Intelligent Network Architecture for Digital Video—SCTE Cable-Tec Expo 2004 information page, Orange County Convention Center, Jun. 2004, 24 pages.
DCAS Authorized Service Domain, Version 1.2, dated Nov. 30, 2005, 54 pages.
DCAS Licensed Specification Abstracts, CableLabs Confidential Information, Jan. 12, 2006, 4 pages.
Digital Video Broadcasting (DVB); DVB SimulCrypt; Part 1: "Head-end architecture and synchronization" Technical Specification—ETSI TS 101 197 V1.2.1 (Feb. 2002), 40 pages.
DVB (Digital Video Broadcasting), DVB Document A045 Rev. 3, Jul. 2004, "Head-end Implementation of SimulCrypt," 289 pages.
Federal Information Processing Standards Publication, US FIPS PUB 197, Nov. 26, 2001, "Advanced Encryption Standards (AES)," 47 pages.
Griffith, et al.,Resource Planning and Bandwidth Allocation in Hybrid Fiber-Coax Residential Networks, National Institute of Standards and Technology (NIST), 10 pages, no date.
Gupta V., et al., "Bit-Stuffing in 802.11 Beacon Frame: Embedding Non-Standard Custom Information," International Journal of Computer Applications, Feb. 2013, vol. 63 (2), pp. 6-12.
High-bandwidth Digital Content Protection System, Revision 1.091, dated Apr. 22, 2003, Digital Content Protection LLC Draft, 78 pages.
Kanouff, Communications Technology: Next-Generation Bandwidth Management—The Evolution of the Anything-to-Anywhere Network, 8 pages, Apr. 1, 2004.
Marusic, et al., "Share it!—Content Transfer in Home-to-Home Networks." IEEE MELECON 2004, May 12-15, 2004, Dubrovnik, Croatia.
Media Server; 1 Device Template Version 1.01 Jun. 25, 2002.
Motorola DOCSIS Cable Module DCM 2000 specifications, 4 pages, no date.
OpenCable Application Platform Specification, OCAP 2.0 Profile, OC-SP-OCAP2.0-I01-020419, Apr. 19, 2002.
OpenCable Application Platform Specifications, OCAP Extensions, OC-SP-OCAP--HNEXT-I03-080418, 2005-2008.
OpenCable Host Device, Core Functional Requirements, OC-SP-HOST-CFR-I13-030707, Jul. 7, 2003.
Opencable, HOST-POD Interface Specification, OC-SP-HOSTPOD-IF-I13-030707, Jul. 7, 2003.
OpenCable Specification, Home Networking Protocol 2.0, OC-SP-HNP2.0-I01-08418, 2007.
OpenCable Specifications, Home Networking Security Specification, OC-SP-HN-SEC-DO1-081027, draft (Oct. 27, 2008).
OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).
OpenVision Session Resource Manager features and information, 2 pages, no date, (http://www.imake.com/hopenvision).
Primergy BX300 Switch Blade user's manual, Fujitsu Corp., Sep. 30, 2002, first edition, pp. 1 to 20.
Real System Media Commerce Suite (Technical White Paper), at http://docs.real.com/docs/drm/DRM.sub-WP1.pdf, 12 pages, Nov. 2001.
Van Moffaert, K., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.
Zhang, et al., A Flexible Content Protection System for Media-on-Demand, ISM China Research Lab, Proceedings of the IEEE Fourth International Symposium on Multimedia Software Engineering (MSE'02), 6 pages.
Google search results.

\* cited by examiner

METHODS AND APPARATUS FOR ACCESS POINT LOCATION

RELATED APPLICATIONS

The present application is related to co-owned U.S. patent application Ser. No. 13/600,064 filed on Aug. 30, 2012 and entitled "APPARATUS AND METHODS FOR ENABLING LOCATION-BASED SERVICES WITHIN A PREMISES", which is now U.S. Patent Publication No. 2014/0066098, and which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data and content distribution and delivery. In one exemplary aspect, the disclosure relates to determining a desirable or optimal location for an access point or other wireless interface within a premises.

2. Description of Related Technology

Extant wireless installations generally rely on a manual means of determining the best location for an access point (sometimes call an "AP" or "WAP", hereinafter "AP"). As is well known, an AP allows for effectively simultaneous communication with multiple wireless-enabled user or client devices in various locations within range of the AP for a given air interface (e.g., Wi-Fi under IEEE Std. 802.11x). The optimal location of the AP is sometimes a three-dimensional spatial problem, as client devices that will communicate with the AP can be located on the same floor of a building or structure in any direction, and also on different floors above and below the AP's position. In addition, at any of the locations where a client device is located, other local factors affecting the client's ability to communicate with the AP may also exist, such as radio frequency (RF) signal path loss/attenuation (such as due to interposed materials), signal reflections, fading, localized "shading" and interference from other RF or electromagnetic sources.

Additionally, the characteristics of an AP and the client devices are such that they may have directional RF properties due to, e.g., variances in antenna gain in different directions.

Furthermore, the construction of buildings has an effect on determining an optimal location, as such construction involves the use of different materials that have different attenuation properties at exemplary radio frequencies used in wireless systems (e.g., 2.4 GHz, 3.6 GHz and 5 GHz), such as concrete, brick, dry-wall, wood, glass, metal framing, etc. Also, signals at these frequencies create multi-path propagation throughout the building, especially at increasing distances from the AP, and can be quite unpredictable. Thus, all the client device locations are individually different in terms of the propagation path to and from the AP.

In addition, even the most advanced tools today rely on an installer or user placing the AP at a 'best guess' position, then making measurements throughout the structure to verify that the entire structure (or at least the portions of greatest importance to the user) is covered adequately in terms of signal strength. Usually the first location that the user or installer places the AP is not optimal, or worse, the user/installer does not have enough information about the system's wireless link performance to make a proper adjustment to the initial location, and hence must make an "educated guess" as to what location might be better. This placement process is iterative, in that the installer will need to make several measurements, then move the AP to another location to improve on the last set of results, until the links to all client devices within the building are deemed sufficient for the final application (streaming video, internet browsing, etc.). In the event that all "critical" locations/applications cannot be serviced with adequate signal, a second AP may even be required, thereby further complicating the installation, and in some cases necessitating hand-offs between one AP and the other when, e.g., a user moves from one location to the other during use.

Therefore, what are needed are improved apparatus and methods for enabling a user to position an access point for optimal connectivity to client devices within a premises, taking into account RF signal path loss/attenuation, signal reflections, fading, localized shading, and interference. Such improved access point location identification methods and apparatus would ideally be provided across multiple client devices within a premises, and would be implemented using mechanisms readily available to a user, thereby obviating use of a specialist such as an installer.

SUMMARY

The present disclosure addresses the foregoing needs by providing, in various embodiments, methods and apparatus for determining a desired/optimal location for an access point.

In a first aspect, a method of determining a desired location within a premises for a wireless access point is disclosed. In one embodiment, the method includes placing each of a plurality of wireless-enabled client devices in respective ones of a plurality of locations within the premises; utilizing the plurality of client devices to exchange signals between one another to collect data relating to one or more radio frequency characteristics at each of the plurality of locations; and utilizing the collected data to determine the desired location.

In a second aspect, a computer readable apparatus comprising at least one computer program is disclosed. In one embodiment, the computer program comprises a plurality of instructions which are configured to, when executed, access a plurality of link data obtained from a plurality of wireless client devices, at least a portion of the data gathered by each of the wireless client devices while monitoring wireless signals from at least one other of the plurality of client devices. In one variant, the plurality of link data is evaluated to identify at least one optimized location from a plurality of candidate locations, the optimized location meeting at least one acceptance criteria for wireless performance.

In a third aspect, a method of remotely installing a wireless access point within a user premises is disclosed. In one embodiment, the method includes: causing a user to place each of a plurality of wireless-enabled client devices in respective ones of a plurality of locations within the user premises, and utilize the plurality of client devices to exchange signals between one another to collect data relating to one or more radio frequency characteristics at each of the plurality of locations. The collected data is received and utilized for determining a desired location. In one variant, the information relating to the determined desired location is provided to the user, the information enabling the user to place the wireless access point within the user premises at the desired location.

In a fourth aspect, a method of determining an optimized placement of a wireless access point at a premises is disclosed. In one embodiment, the method includes utilizing a plurality of wireless enabled devices to transmit and receive signals in a substantially round-robin fashion in order to characterize a performance of each of a plurality of wireless links between the wireless enabled devices. The characterizations of the plurality of wireless link performances are utilized for identifying at least one location where the performance of the plurality of wireless links is optimized when considered in an aggregate.

In a fifth aspect, a method of identifying radio frequency link changes over time is disclosed. In one embodiment, the method includes, at a first time, placing a plurality of wireless devices in a first prescribed spatial configuration, and using each of the wireless devices, including characterizing wireless links between the plurality of wireless devices when placed in the first prescribed spatial configuration so as to produce first characterization data. At a second time subsequent to the first time: the plurality of wireless devices are placed in a second prescribed spatial configuration, and each of the plurality of wireless devices are used, including characterizing the wireless links between the plurality of client devices when placed in the second prescribed spatial configuration so as to produce second characterization data. The first and second data are compared to, inter alia, identify one or more changes in performance of one or more of the wireless links.

Other features and advantages of the present disclosure will immediately be recognized by persons of ordinary skill in the art with reference to the attached drawings and detailed description of exemplary embodiments as given below.

Figure 1:
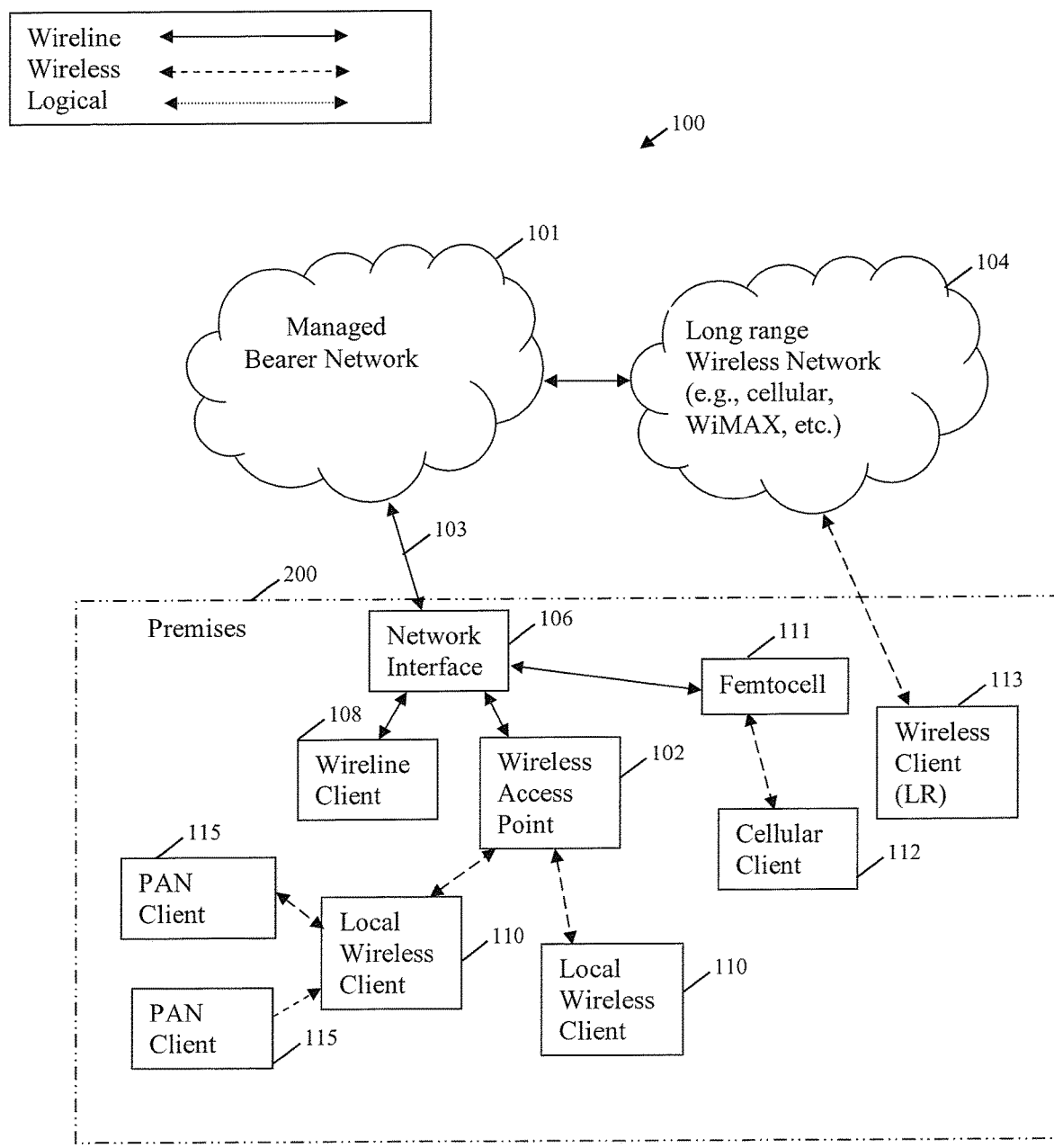
FIG. 1 is a functional block diagram illustrating an exemplary network architecture for providing broadband and other services to a premises.

All Figures © Copyright 2014 Time Warner Cable Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "DOCSIS" refers to any of the existing or planned variants of the Data Over Cable Services Interface Specification, including for example DOCSIS versions 1.0, 1.1, 2.0 and 3.0.

As used herein, the term "gateway" includes, without limitation, devices configured to interface with a network, and pass signals to or exchange signals with, another device in communication therewith.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the term "Wi-Fi" refers to, without limitation, any of the variants of IEEE-Std. 802.11 or related standards including 802.11a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FUSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

The present disclosure provides, inter alia, methods and apparatus for determining at least one desired or optimal access point location within a premises. In one embodiment, software (e.g., an application) is downloaded to or otherwise disposed on one or more devices in a user premises. The software application enables each of the devices to communicate with one another (e.g., in "round robin" fashion) and collect a plurality of data. An access point (AP) is then introduced to the system; the access point uses the data collected from the plurality of user devices to determine a desirable or optimal location for the placement of the AP. In one variant, one or more of the user devices is configured to analyze the collected data in support of AP location determination. Alternatively, all or a portion of the collected data may be provided to a network (e.g., managed network headend) entity or third party for analysis thereat.

The foregoing exemplary embodiment of the methodology in effect turns the prior art paradigm of AP placement "on its head", in that inter alia, one or more client devices are leveraged as mock access points, thereby allowing for much more efficient and richer RF signal characterization of a given space/structure than under the prior art iterative approach of placing the AP at a first location, measuring signal strength at multiple possible use locations, placing the AP at a second location, repeating, and so forth.

Once the desired/optimal location is determined, the access point is placed thereat, and the client devices returned to a normal operation. In one variant, further or ongoing data may be collected as the system operates to ensure that the location selected remains suitable/optimal. In the instance that changes in the topology of the user premises (or other changes, such as to the client device capabilities) cause significant alterations to the signals received at the various client devices (or vice-versa, at the AP), a new desired/optimal location for the access point(s) may be determined.

Methods of operating the network(s), client devices, and business models using the network and techniques referenced above, are also described.

The various aspects of the present disclosure may be useful in, inter alia, 802.11b/g/n/ac systems involving a single access point (or even multiple access points) and one or more client devices, such as a residential Wi-Fi installation. For example, the various aspects disclosed herein are useful to cable service companies, Telco, and other high-speed data (HSD) service providers and Video-over Wi-Fi (VoW) service installations.

Detailed Description of Exemplary Embodiments

Exemplary embodiments of the apparatus and methods of the disclosure are now described in detail. While these exemplary embodiments are described in the context of the aforementioned WLAN (e.g., Wi-Fi) technology, it will be appreciated that the apparatus and techniques described herein may be utilized in any number of other applications, including without limitation in other types of wireless networks (e.g., personal area networks or PANs, mesh networks, or piconets) or radio frequency communications systems.

Moreover, while some embodiments are described herein in the context of a managed content distribution network (e.g., hybrid fiber coax (HFC) cable system architecture having a multiple systems operator (MSO), digital networking capability, IP delivery capability, and plurality of client devices/CPE), the general principles and advantages of the present disclosure may be extended to other types of networks and architectures, whether broadband, narrowband, wired or wireless, managed or unmanaged, or otherwise, the following therefore being merely exemplary in nature.

It will also be appreciated that while described generally in the context of a consumer (i.e., home) end user domain, the present disclosure may be readily adapted to other types of environments (e.g., commercial/enterprise, government/military, etc.) as well. Myriad other applications are possible.

Also, while certain aspects are described primarily in the context of the well-known Internet Protocol, it will be appreciated that the present disclosure may utilize other types of protocols (and in fact bearer networks to include other internets and intranets) to implement the described functionality.

It is also appreciated that while many of the embodiments set forth herein are described in terms of an indoor paradigm (e.g., within a house, office building, shopping mall, etc.), the various aspects of the disclosure are in no way so limited, and may readily be applied to outdoor or hybrid indoor/outdoor applications.

Other features and advantages of the present disclosure will immediately be recognized by persons of ordinary skill in the art with reference to the attached drawings and detailed description of exemplary embodiments as given below.

Network Architecture—

FIG. 1 illustrates a typical network configuration with which the exemplary apparatus and methods of the present disclosure may be used. The various components of the network configuration 100 include (i) a bearer network 101, typically a managed network such as an HFC (hybrid fiber coax) cable network, satellite network, fiber-based network such FTTH or FTTC, hybrid fiber-copper (HFCu) network, etc., as well as unmanaged networks such as internets (e.g., the Internet); (ii) a premises 200 (described in greater detail subsequently herein); (iii) a long-range wireless network (e.g., a cellular or WiMAX network) 104 servicing mobile users 112, 113 either directly, or indirectly via a femtocell 111 or the like; (iv) a network interface 106 (including e.g., a modem for communication with the bearer network medium 103, such as QAM modulated RF carriers, DSL signals (e.g., above 20 KHz), T1, optical carriers, and the like) which communicates with the bearer network 101; a wireless (local) access point 102, typically in wireline communication with the network interface 106; (v) a wireline client 108, such as a PC, smart TV, gateway, etc. in wireline communication with the network interface 106; (vi) one or more local wireless clients (e.g., tablets, smartphones, laptops, etc.) 110 in wireless communication with the access point 102; and (vi) one or more PAN (personal area network) clients such as a wireless keyboard, mouse, etc. 115 in wireless communication with the wireless client 110 (or the long-range wireless clients 112, 113). It will be appreciated that the configuration 100 of FIG. 1 is purely for purposes of illustration, and may take on literally a limitless number of other configurations consistent with the present disclosure.

As noted above, exemplary bearer networks 101 useful with the present disclosure include any form of managed or unmanaged networks, such as e.g., those described in U.S. Patent Application Publication No. 2003/0056217, entitled "TECHNIQUE FOR EFFECTIVELY PROVIDING PROGRAM MATERIAL IN A CABLE TELEVISION SYSTEM", published Mar. 20, 2003, issued as U.S. Pat. No. 8,713,623 on Apr. 29, 2014, and incorporated herein by reference in its entirety (describing one exemplary broadcast switched digital architecture), U.S. Patent Publication No. 2012/0023535 entitled "APPARATUS AND METHODS FOR PACKETIZED CONTENT DELIVERY OVER A BANDWIDTH-EFFICIENT NETWORK", published Jan. 26, 2012, issued as U.S. Pat. No. 8,997,136 on Mar. 31, 2015, which is incorporated herein by reference in its entirety (describing delivery of packetized content via a bandwidth-optimized network), and U.S. Patent Application Publication No. 2011/0103374 filed on Apr. 21, 2010, and entitled "METHODS AND APPARATUS FOR PACKETIZED CONTENT DELIVERY OVER A CONTENT DELIVERY NETWORK", and issued as U.S. Pat. No. 10,264,029 on Apr. 16, 2019, incorporated herein by reference in its entirety (describing inter ally, a 3GPP IMS (IP Multimedia Subsystem) network with common control plane and service delivery platform (SDP)). It will be appreciated that the methods and apparatus of the present disclosure advantageously are effectively agnostic to the bearer network architecture, thereby providing a large degree of applicability in various user/subscriber applications.

Exemplary Premises Network Architectures—

Figure 2A:
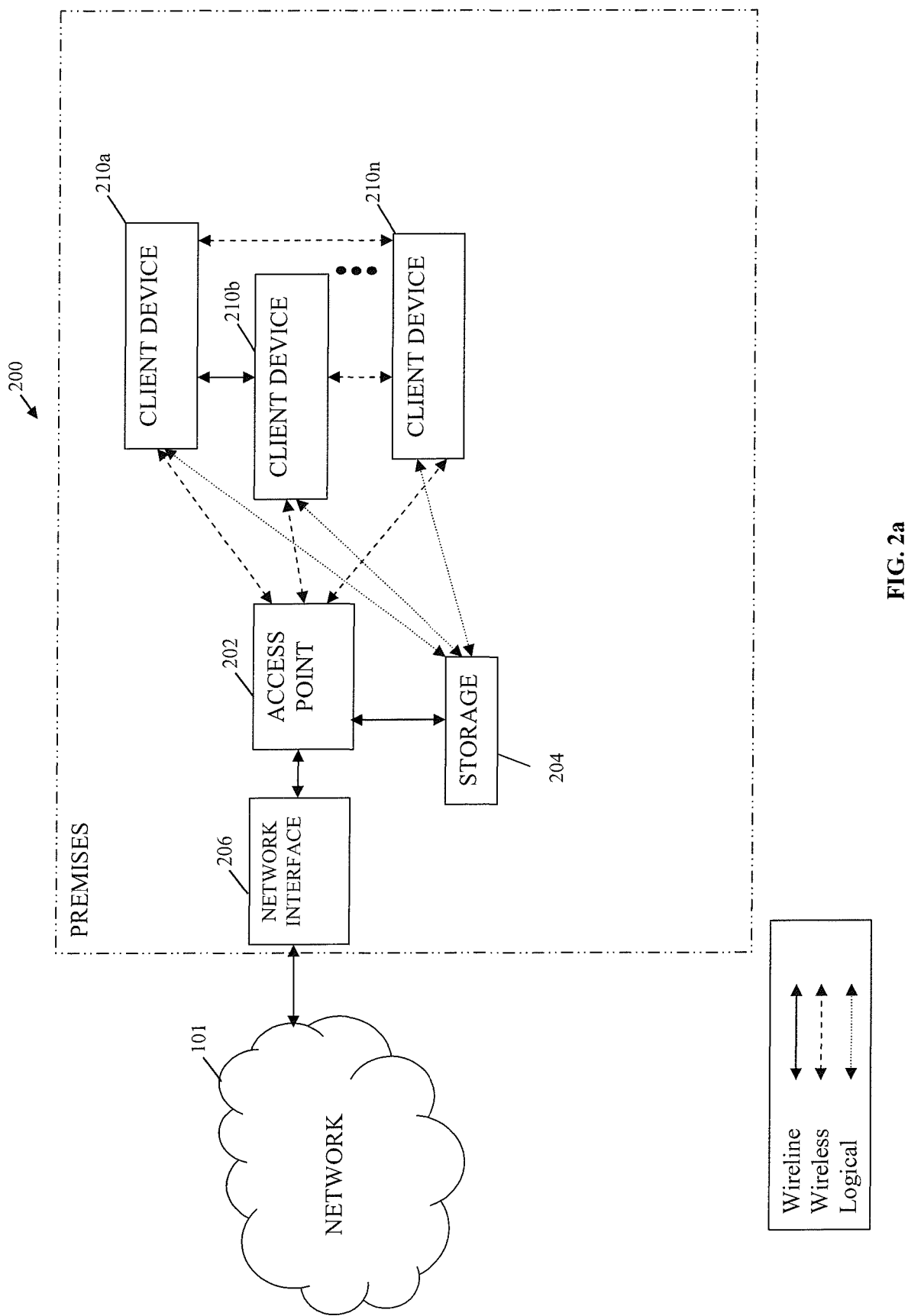
FIG. 2a is a functional block diagram illustrating one exemplary embodiment of a premises network architecture (single wireless access point) for enabling optimal access point location identification in accordance with the present disclosure.
Figure 2B:
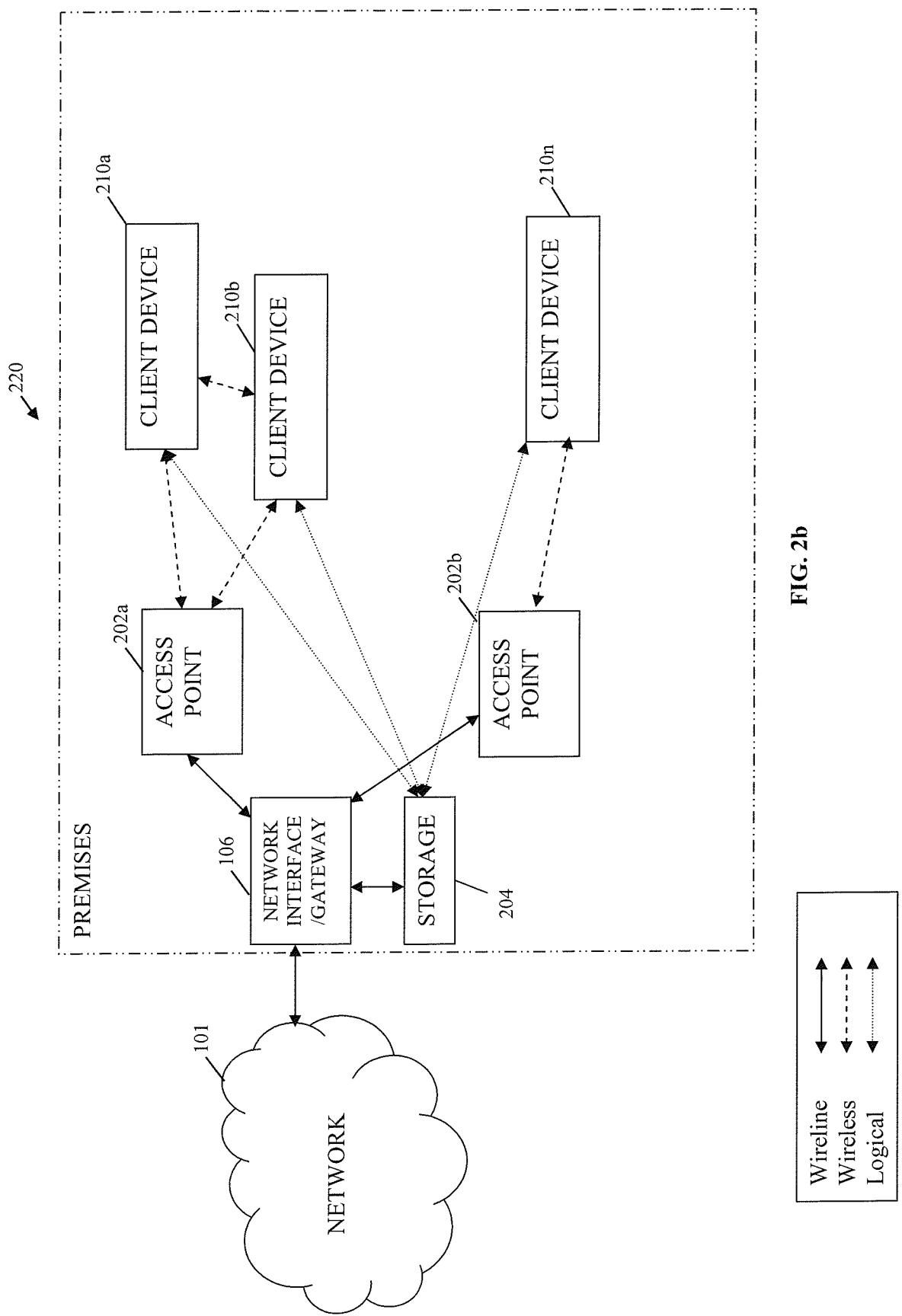
FIG. 2b is a functional block diagram illustrating another exemplary embodiment of a premises network architecture (more than one wireless access point) for enabling optimal access point location identification in accordance with the present disclosure.

Referring now to FIGS. 2a and 2b, exemplary embodiments of a premises network architecture 200 for providing desired or optimal access point location identification services according to the present disclosure are illustrated. Other portions of the exemplary premises architecture 200 shown in FIG. 1 discussed above have been deleted for clarity, but may or may not be present as desired for a given application or use case.

It will be appreciated that as used herein, the terms "desired" and "optimal" and "best" are used without limitation to refer to a location, installation or condition which is desirable or useful, whether or not fully optimized for all parameters under consideration (e.g., all signal strengths). For instance, it may be that there is no truly "optimal" location for an AP in a given premises; i.e., the user may have to sacrifice performance, convenience, and/or other considerations based on the particular attributes of the installation.

It is also appreciated that terms such as "optimal", "best" etc. as used herein may be relative, and based on any number of considerations which may or may not relate to performance of a wireless link or similar functionality. For example, a "best" position for an AP for a given user may be one which maximizes both link performance and ergonomics/utility/aesthetics for the user; such as where a user sacrifices some level of link performance to have the AP placed in a location which is not inconvenient or an eyesore (i.e., it is not the "best" with respect to RF parameters/link quality, but is the best optimization of multiple considerations). As illustrated in FIG. 2a, the premises network 200 generally comprises a network interface 206 such as a modem or other such apparatus (e.g., a DOCSIS compliant cable modem in the instance where the bearer 101 is an HFC network), an access point device 202, and a plurality of client devices 210a-210n.

In the illustrated embodiment, the premises network 200 may also comprise a storage device 204. This storage device may be "stand alone" (e.g., a separate mass storage device such as a disk or flash drive, RAID array etc.), or may be incorporated into the form factor of any of the other components, or yet others (such as a local PC, gateway device, smart TV or TV support apparatus, etc.). The storage device may also be part of or associated with the access point device 202. As illustrated, the client devices 210 are in "logical" communication with the storage device 2014, which may comprise direct or indirect physical communication (such as via an intermediary process, device, or via a proxy) between the entities so as to enable exchange of data/applications, The access point device 202 communicates with the content delivery network 101 via the interface 206, as well as to each of the client devices 210 as discussed in greater detail below. It is further appreciated that the access point device 202 and/or the client devices 210 may communicate with other networks including e.g., an interne (such as the Internet 111), long-range (e.g., cellular or WiMAX) wireless networks, satellite networks, mesh networks, etc.

In one exemplary embodiment, the client devices 210 of the premises network 200 comprise mobile devices (i.e., devices which may move within a premises or beyond) as well as fixed devices (i.e., devices which are associated to a single, static location, such as a server or PC). The client devices 210 are in one variant configured to allow a user to download one or more applications thereto (e.g., via the aforementioned logical/physical connections), although it will be appreciated that other mechanisms for placing a given application on the clients may be utilized consistent with the present disclosure, including e.g., having the applications prepositioned on the devices at time of manufacture or provisioning (e.g., by a wireless carrier when the mobile device/subscription is purchased), via "hard" media such as a CD-ROM, flash drive, or via download from a third-party provider via the Internet (such as from an "app store").

In one embodiment, after the one or more applications have been downloaded or otherwise accessed, the subscriber can use a location profile application (from among the downloaded one or more applications, described in greater detail subsequently herein) to establish specific locations within the premises (e.g., living room, kitchen, bedroom, bathroom, etc.) where the subscriber uses one or more of the client devices 210. In addition, for each of the client devices 210, the user may prioritize or otherwise allocate usage for the locations based on an estimated or actual use of the client device 210 at each specific location. Such prioritization may be on any type of scale or according to any scheme, such as e.g., "fuzzy" variables such as "frequently", "never", "high", or "low", or discrete variables such as "1 to 10" or "75% of the time". For example, a user might never use their laptop in the kitchen ("never"), but frequently use the same laptop in the office or bedroom ("frequently"). Likewise, a specific user might prioritize signal strength/bandwidth (roughly related to download/upload speed) over convenience or aesthetics (e.g., "I don't care where it is, so long as it's fast as possible", such as for a chronic high-bandwidth consumer, or "I am willing to sacrifice speed for having access (albeit slower) at more locations within the premises" for a less bandwidth-intensive, convenience-oriented user.)

The prioritized/allocated list allows the client device 210 or the access point device 202 have better granularity when determining the most optimal location for the access point device 202. Specifically, the optimization process can better balance the various competing considerations and trade-offs by virtue of knowing what the relative importance of each is, and its magnitude or scale.

It will be appreciated that depending on the protocol used for wireless (local) communication between the client devices 210 and the access point device 202, the individual client devices 210 may be able to (i) communicate wirelessly directly with each other, in addition to communicating with the access point; (ii) communicate wirelessly with each other, yet only via communication with the access point; or (iii) both (i) and (ii). The exemplary embodiment assumes at least (i) above, although this is by no means a prerequisite for practicing the techniques described here, and the methodologies of the present disclosure may be readily adapted by those of ordinary skill to enable indirect communication for example. For instance, the radio transceiver/front-end of a given client may be able to sense and record/evaluate RF signals generated by another client, yet not be able to use those signals (or others) to communicate directly with the originating client device, based upon the topology of the underlying wireless protocol (e.g., one "master" with multiple "slaves"), the latter which can only communicate with the master bi-directionally.

One or more applications provided to the client devices 210 (which may be part of the same application discussed above) causes each of the client devices 210 to act as an access point, or operate in an ad-hoc network mode. The client device 210, when acting as the access point, communicates wirelessly with all of the other client devices 210 within the premises (and within range of its air interface) to gather/access link data for each of the other client devices 210. The link data may include e.g. (and without limitation), Service Set Identifier (SSID), received signal level/strength (e.g., RSSI), physical link rate, link quality, missed beacons, packet loss, bit error rate (BER), packet error rate PER, etc. The link data may relate to the connectivity of the accessed client device 210 over a given time period of time (e.g., ranging from a few seconds, or up to a few minutes, or even hours or more, such as where historical data for that particular location is available).

Note that the client devices 210 may communicate using any well-known communications protocol, whether wired or wireless (e.g., LAN/WAN, Ethernet, Wi-Fi, Bluetooth, etc.) when acting as the access point, to communicate relevant data for the other client devices 210 or the storage device 204.

The client device 210 acting as the access point, in one embodiment, builds a table or other data structure of link data/statistics internally (using the application software present thereon), from data collected from the other client devices 210 in the premises network 200. The collected data (which may include e.g., SSID, received signal level/RSSI, physical link rate, link quality, missed beacons, packet loss, BER/PER, etc.) demonstrates how the client device 210 which is acting as the access point "views" each of the connected client devices 210 within the premises network 200 from a RF signal standpoint. The client device 210 may obtain a higher resolution or more detailed profile of the connectivity (link) data of each of the connected client devices 210 by increasing the sounding frequency (i.e., the frequency with which the client device 210 acting as the access point samples or "pings" the client devices 210 in the premises to obtain data therefrom). This approach may be implemented so as to increase the accuracy of the desired optimal access point location determination. For example, a single sampling or data point for a given client device may or may not be representative of the actual link performance over time, since variations in link performance as sensed by the "AP" client device may occur as a function of time due to, e.g., variations in the status/presence of interfering emitters, fading and path artifacts, etc. Hence, an averaged or otherwise multi-data-point evaluation will increase the likelihood that the characterization of the link is accurate.

In another embodiment, the client device 210 acting as the access point transmits the collected connectivity data to the network 101 (e.g., to a server or process managed by the operator of the network 101), where the network server/process builds the table of link statistics.

In yet another embodiment, the client device 210 acting as the access point transmits the collected connectivity data to the storage device 204 for subsequent analysis by, e.g., an application running on the user's PC, a gateway (if present), or other device in communication with the storage device 204.

As will be discussed in greater detail below, information may be extracted during the foregoing process which is used to identify a location within a user's premises at which placement of the access point will ensure the best (or optimal) communication to the connected devices. For example, various data relating to the signal quality and amplification needed to transmit signals to and/or receive signals from individual ones of the client devices 210 is collected. The data may include e.g., Wi-Fi channel state, RF power/RSSI, delay, signal phase, signal quality, amplification, etc. The data is then compared for each client device 210 location within the premises (such as based on comparison to previously gathered data and/or standard or reference data, or minimum acceptability criteria), such that the client device 210 for which communication to the other devices is best may be selected for placement of the access point device 202.

FIG. 2b illustrates an exemplary multi-access point premises network 220, wherein the premises is served by two (or more) APs 202a, 202b. This arrangement is utilized, inter alia, when a single AP has insufficient range, connection loss between AP and the client devices 210, multi-path reflections, and/or the premises has insufficient RF performance (e.g., has very thick steel/concrete walls, is multi-leveled, etc.) to be serviced by a single AP. In this case, a first subset of client devices 210 are serviced by the first AP 202a, while a second subset of client devices 210 are serviced by the second AP 202b. It will be recognized that client devices can be "handed off" or migrate between APs (e.g., when a user moves from one room to the next), and moreover a given location within the premises may be serviced simultaneously by both APs, to varying levels (i.e., there may be sufficient signal strength/link performance at a given location from both of the two APs 202a, 202b).

Exemplary Methodology—

Figure 3:
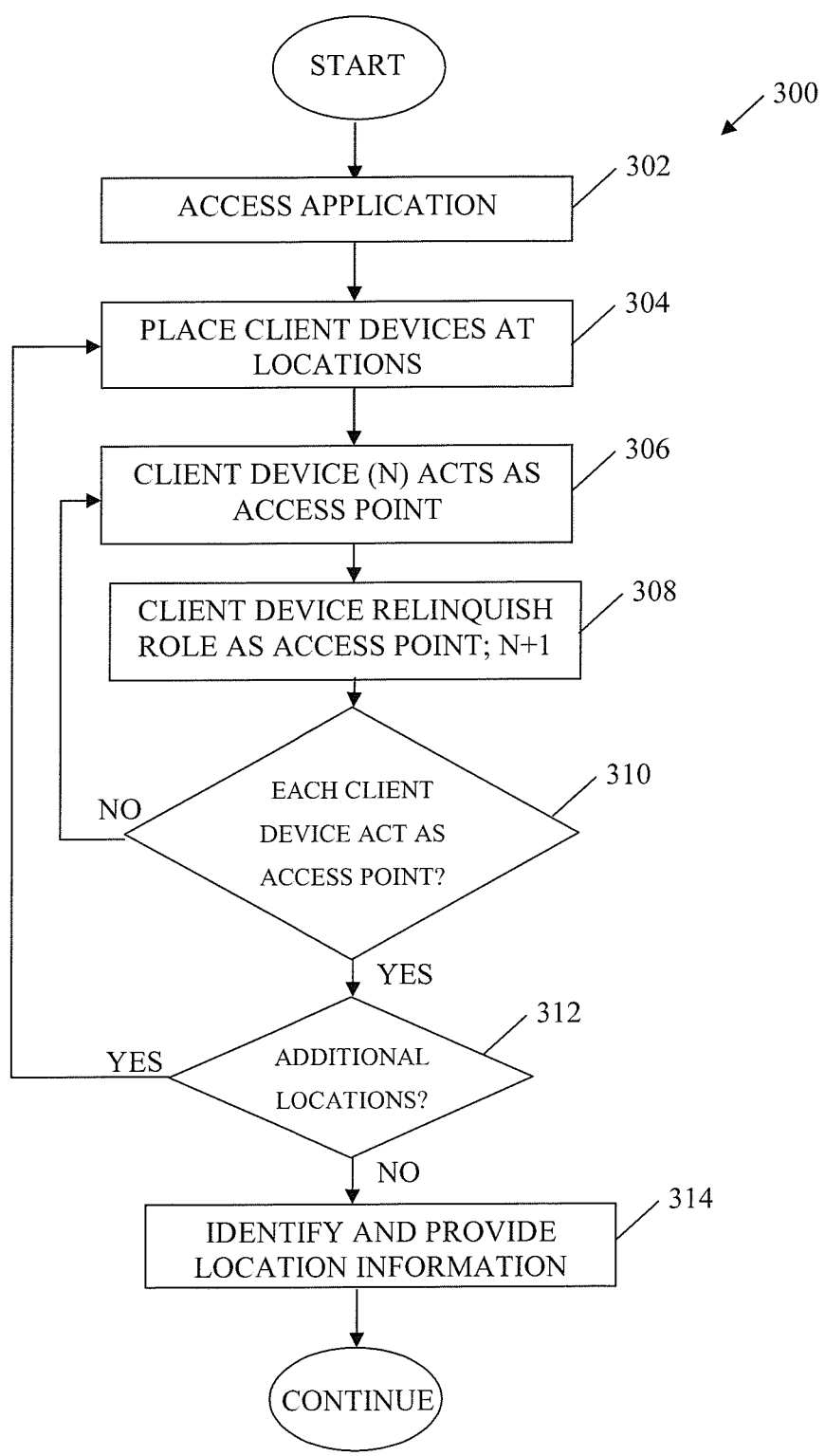
FIG. 3 is a logical flow diagram illustrating an exemplary embodiment of a method for enabling optimal access point positioning in accordance with the present disclosure.

FIG. 3 illustrates an exemplary embodiment of a method 300 for determining an optimal location to place an access point device 202 within a user's premises.

As shown, the method 300 generally comprises causing or allowing a user to access (e.g., download and install) one or more applications to each of the user's client devices 210 (step 302). In one variant, the applications are downloaded directly from the network 101 (such as via a hub or headend entity). In another variant, the application may be downloaded from the Internet 111. As previously noted, the application(s) may also be prepositioned on the relevant devices, or yet other approaches used (e.g., peer-to-peer (P2P) sharing, etc.).

Next, per step 304, the "provisioned" client devices 210 are placed at positions within the premises that the subscriber would normally use the client devices 210. In one variant, the user generates a plurality of location profiles for each of the client devices 210 within the premises. The location profiles, in one embodiment, include a location name (for example, office, bedroom, living room, kitchen, bathroom, etc.), and a subscriber's use ranking (or other priority/allocation structure as described supra) thereat. The use ranking/allocation may be for instance based on an estimate and/or actual use of the client devices 210 at each location. In another embodiment, the location profile further includes link (connectivity) data as will be discussed elsewhere herein.

The user then accesses the downloaded application and initiates an installation mode. In one embodiment, the installation mode of the exemplary embodiment causes each of the client devices 210 to act as the access point via an ad-hoc network mode of operation (step 306).

In another embodiment, the access point device 202 issues a beacon signal. The beacon signal "pings" the client devices 210 making the client devices 210 visible to the access point device 202. The access point device 202 then determines that the client devices 210 are above a valid threshold for data transmission between the access point device 202 and the client devices 210. The client devices 210 that are below the minimum threshold for communication can be recorded by the access point device 202 as too distant from the access point device 202. The access point device then transmits this information to the client devices 210, which allows the client device 202 acting as the ad hoc access point know when it has finished "pinging" the other client devices 202 within the premises 200, as will be discussed elsewhere herein.

The client device 210 acting as the ad hoc access point connects to or "pings" all of the other client devices 210 to generate the location profile and/or the connectivity data (e.g., Service Set Identifier (SSID) received signal level/RSSI, physical link rate, link quality, missed beacons, packet loss, etc.). As previously noted, the connectivity data may represent signal quality over a duration of a few seconds, a few minutes, or according to yet other schemes (e.g., including historical or even extrapolated data). In one embodiment, the client device 210 acting as the access point builds a table of link statistics from the collected data. The data is illustrative of how the client device 210 acting as the access point "views" each of the connected client devices 210 from a radio frequency perspective.

In another embodiment, an entity of the network 101 (e.g., network side server with application software running thereon) builds the table of link statistics from data collected by the client device 210 when acting as the access point (and using data from other client devices, so as to provide one comprehensive characterization of the premises). In one variant, each of the client devices 210 transmits its collected data relating to the links to the network entity via e.g., an upstream channel such as via the network interface 206 (e.g., DOCSIS modem, out-of-band HFC channel, etc.), or via another interface such as a cellular, WLAN, or WiMAX interface separate from the network interface 206.

In yet another embodiment, the client device 210 acting as the access point transmits the collected connectivity data to the storage entity 204, where the data can be compiled (i.e., data from each of the different clients acting as access points stored), and accessed by any connected device or process, such as a gateway, wired or wireless tablet or laptop or PC, smartphone or smart TV, or even the access point device 202 itself, which then utilizes the stored data to determine the desired/optimal placement of the AP.

In yet another embodiment, the premises network 200 is further configured to generate dynamic or "moving" tables based on, for example, data such as that described in co-owned, co-pending U.S. Patent Publication No. 2014/0066098 entitled "APPARATUS AND METHODS FOR ENABLING LOCATION-BASED SERVICES WITHIN A PREMISES", published Mar. 6, 2014, issued as U.S. Pat. No. 8,862,155 on Oct. 14, 2014, incorporated herein by reference in its entirety. The foregoing application discloses, inter alia, improved methods and apparatus for enabling location identification services within a premises. In one embodiment of the present disclosure, the client device 210 acting as the access point characterizes movement or predictable pathways within the premises. To do so, the user assigns qualifiers for each room within the premises, such as, "kitchen", "family room", "dining room", "bedroom", etc. In addition, each location may be associated with more than one location profile. For example, if a family room is large, the user may seek to generate a location profile for multiple spots within the family room.

Figure 4:
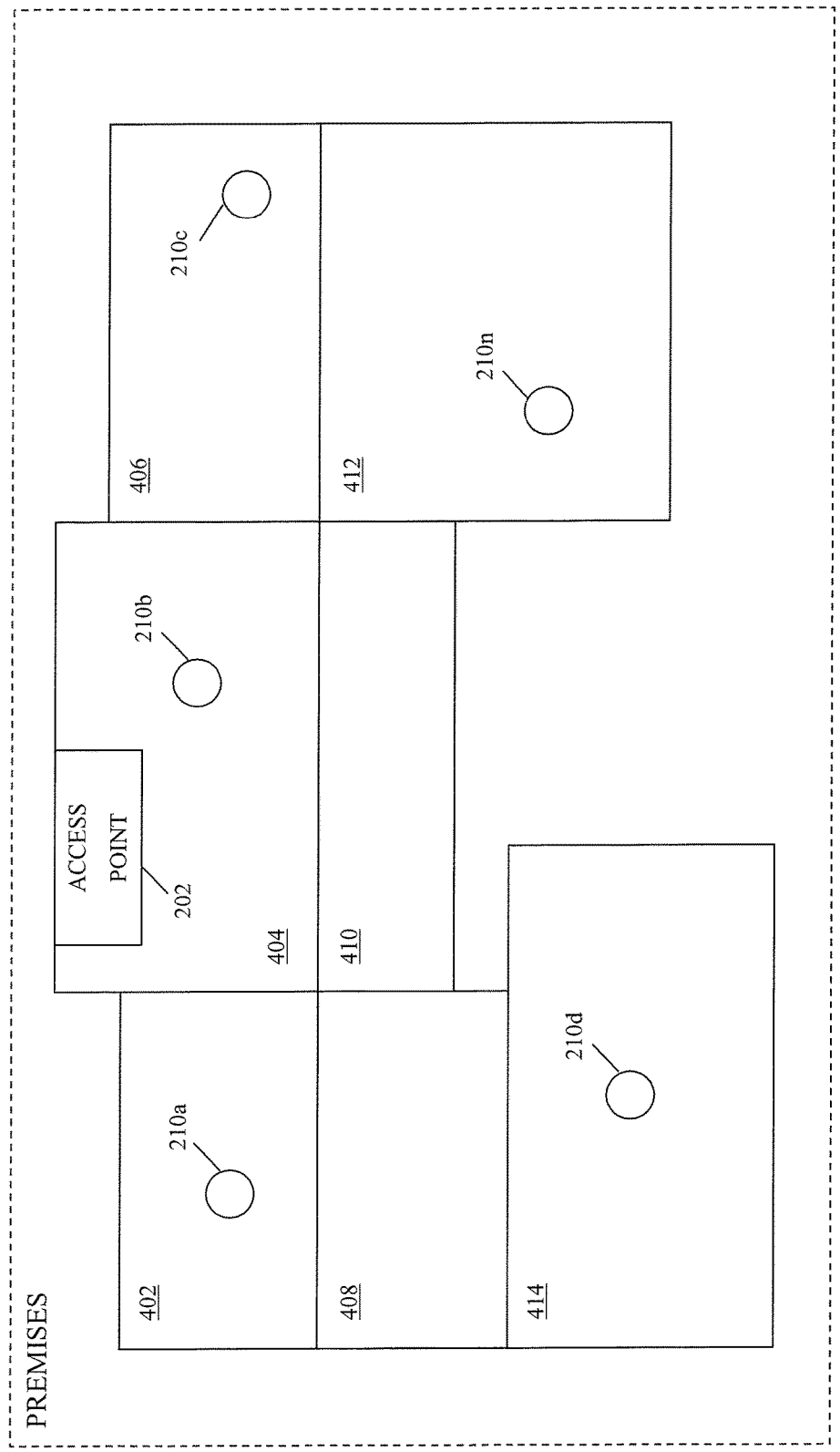
FIG. 4 is a block diagram illustrating a consumer premises having multiple locations identified therein.

The foregoing concepts may be applied herein, as illustrated in the exemplary premises of FIG. 4. As shown, the premises network 200 will not expect to see movement of the client devices 210 directly from e.g., room 402 to room 406 (in that the two are not physically proximate). Rather, the client device 210 acting as the access point is configured to learn (via the downloaded application and sensing of signals from the other clients) that a predictable pathway includes movement from the room 402, through room 404, to room 406. In order to obtain the requisite information to generate moving profiles, the client device 210 acting as the access point uses high-frequency or even continuous pinging as the user moves the other client devices 210 within the premises. The client device 210 acting as the access point further employs one or more routines within the downloaded application to analyze information extracted from the other client devices 210 to generate one or more rules for which rooms within a premises are near one another. Using the dynamic or moving antenna profiles, a likely destination of the client devices 210 within the premises can be derived or speculated, and further resolved as additional measurements are taken during use. This "moving" mode can also be triggered by movement of the client device 210 itself during the determination of the optimal access point location; e.g., using the extant accelerometer(s) of the client device 210, Doppler effect, GPS data, or other mechanism for detecting movement of the client devices 210.

The foregoing "moving" profiles are useful, among other things, from the standpoint that fixed placement measurements of link properties may not capture or accurately characterize interstitial or alternate locations in terms of signal quality. For example, if a user places four (4) client devices at four discrete locations in the premises, and selects an "optimal" AP location based on data obtained from these four devices, the behavior of the client devices while (i) in different locations than those where the individual clients were placed, and (ii) moving from location to location, may not be accurately reflected. It may in fact be the case that one or more of the clients lose signal/connectivity with the AP when moving between rooms, or relocating to another point within e.g., a large room. If a common use case for the given user is to be mobile while using their client device (e.g., video chatting while roaming between rooms), then a "static" characterization may not optimize the AP placement for this use case.

Referring back to FIG. 3, at step 308, the client device 210 acting as the ad hoc access point relinquishes the role as the access point (turns off access point mode). In one embodiment, the client device 210 acting as the access point knows when it has finished "pinging" the other client devices 210 within the premises 200 based on the plurality of location profiles generated by the user for each of the client devices 210.

In another embodiment, the client device 210 acting as the access point knows when it has finished "pinging" the other client devices 210 within the premises 200 based on the information received from the access point device 202 during the installation mode. During the installation mode the access point device 202 issues a beacon signal, which "pings" the client devices 210 making the client devices 210 visible to the access point device 202. The access point device 202 then determines and records which of the client devices 210 are above a valid threshold for data transmission between the access point device 202 and the client devices 210. The access point device 202 then transmits the information to the client devices 210 within the premises.

In yet another embodiment, when the client device 210 acting as the access point cannot ping or connect, or loses a signal with at least one of the client devices 210, it moves on to the next client device 210 within the premises, and records that the client devices 210 that could not be reached are too distant (or could not be communicated with for other reasons) from the client device 210 acting as the access point.

In yet another embodiment, when the client device 210 acting as the access point cannot ping or connect, or loses a signal with at least one of the client devices 210, it relinquishes the role as the access point. In this embodiment, the location of the client device 210 acting as the access point is removed from consideration in the determination of optimal access point location within the premises.

Next, at step 310, it is determined whether all of the client devices 210 have had an opportunity to act as the access point (and collect connectivity data from the other devices). If not, the next or remaining client devices 210 begin again at step 306 to act as the ad hoc access point, and collect connectivity data from each of the other client devices 210 within the premises.

Once it has been determined that all of the client devices 210 have acted as the ad hoc access point, it is further determined whether the subscriber uses one or more of the devices at yet other, different location within the premises per step 312. Stated differently, the user may have only a limited number of actual client devices, but may use one or more of these devices as multiple locations. If so, the user may optionally move one or more of the client devices 210 to one or more new locations within the premises (step 304), and each of the client devices 210 acts as the ad hoc access point and collects connectivity data from the other client devices 210 within the premises at the new location(s) (step 306). The user continues to move the client devices 210 to new locations within the premises until all the client devices 210 have been placed at locations within the premises that the user typically or may use the client devices 210.

It is also appreciated that, under the foregoing process of step 312, a given client device or type of client device may act as a proxy for another device/type. For instance, a user could feasibly use the Wi-Fi transceiver on a smartphone to "stand in" for a Wi-Fi enabled tablet or laptop, or vice versa, if the actual device to be used at the location is unavailable or incapable of completing the process described above for some reason (e.g., the user hasn't purchased it yet). While use of the actual device that will ultimately be used at a given location in the premises for conducting the optimization process described herein is ideal, other similarly equipped devices can provide a good approximation. Hence, in one implementation, when a user is placing heterogeneous client devices (e.g., smartphone, tablet, laptop, etc.) in the premises for subsequent characterization/determination of optimal AP location, they place the same device that will be used in a given location most often at that same location (and ideally in the same position/orientation as when used), so as to most accurately characterize link performance.

Moreover, it may be the case that a user desires to use multiple different devices at the same location, whether (effectively) concurrently, or at different times, and each of these devices may have variations in their response/performance. For example, WLAN-enabled tablet with multiple-input multiple-output (MIMO) capability may perform more robustly than a non-MIMO enabled smartphone at the same location. Other varying device characteristics include e.g., good versus poor antennas, different powered transmitters, different receiver sensitivity, 1×2, 2×2 spatial stream capability, etc. Hence, in one embodiment, the aforementioned process is conducted using multiple devices at the same location (whether in tandem or sequentially), so that the links for each combination of devices can be evaluated. In another alternative, the system may be configured to utilize a "margin of error" or otherwise account for such differences between devices at the same location. In either instance, the reported information remains valuable to determining the optimal path (i.e., does not affect the performance of the optimal path algorithm).

Once it has been determined that all of the client devices 210 have acted as the ad hoc access point and have been moved to each location where use thereof is anticipated, a table or compilation of link statistics is created using the location profile and connectivity data collected. That is, the connectivity data collected by each of the client devices 210 acting as the access point may be stored for later use, such as in the form of individual tables or other data structures (e.g., tuples) on each client device 210. Alternatively, the connectivity data from all of the client devices 210 may be combined to a single table/structure at one of the client devices 210 and/or the storage entity 204, or as another option sent to a network entity (e.g., server within a managed network) for compilation and optional analysis.

An exemplary table of link statistics is illustrated in Table 1 below. The table of link statistics provides the client devices 210, the access point device 202, and/or the network entity with discrete values for each measured characteristic such as receive power (pr), the error rate (er), and the client transmit power (pt), signal quality, and amplification needed to transmit signals to and/or receive signals from each of the client devices 210, at each of the locations. The discrete values are established to include all possible values which may be received when at least one of the client devices 210 is within a given location (e.g., family room, bedroom, kitchen, etc.). The table of link statistics may be further comprised of transmitter and receiver characteristics covering Wi-Fi channel state, RF power, delay, signal phase, signal quality, amplification, MIMO, beamforming, etc. Other profiling information may include information regarding a nearby Wi-Fi hotspot (such as a neighbor's Wi-Fi hotspot, AP, RF channel(s) in use, SSID power level, airtime usage, etc.). The combination of this information for the client devices 210 may then be used for determining the optimal location or locations for the access point device 202.

TABLE 1

| Location | Client Device 1 | Client Device 2 | Client Device 3 |
|---|---|---|---|
| Family Room | [pr, er, pt] | [pr, er, pt] | [pr, er, pt] |
| Bedroom | [pr, er, pt] | [pr, er, pt] | [pr, er, pt] |
| Kitchen | [pr, er, pt] | [pr, er, pt] | [pr, er, pt] |

As noted above, once all of the client devices 210 have acted as the ad hoc access point, the user installs the access point device 202 at any location within the premises. In one embodiment, the access point device 202 connects to each of the client devices 210 via wireless or wireline link to capture their positions and collect the tables built by each of the client devices 210 (when they acted as the access point). This may occur via a push or pull mechanism, or other means (such as periodic polling). Alternatively, as noted elsewhere herein, the collected data may be stored at the storage entity 204 and be made accessible to the newly connected access point device 202.

It will be appreciated that at this stage, connection of the access point to the clients (or storage entity) can occur via any type of interface suitable for exchanging data, since the AP is at this point merely gathering data obtained by the client devices 210 to utilize in its determination of the optimal AP placement location.

In another variant, use of the AP at this stage is obviated through use of a DSTB, gateway or other device (e.g., PC) which communicates with a network-side entity (e.g., the aforementioned server) to pass the data thereto for analysis. In one implementation, the DSTB, gateway or PC runs application software which gathers the collected data from the client devices 210 (such as via a WLAN or PAN interface), and transmits this data upstream to the server, where the data is collected and analyzed. The server then communicates information back to the DSTB/gateway/PC application, which the user can then access (such as via a graphical on-screen display or the like) to place the AP at the optimal location within the premises. This approach relieves the user of having to do the analysis themselves, although it will be appreciated that a similar analysis application can be utilized by the user at the premises as well (e.g., the DSTB/gateway/PC itself analyzes the collected data and instructs the user as to the optimal location, without resort to the network entity). Salient benefits of the use of the network entity, however, include (i) the network manager (e.g., MSO), if any, can store the data and use it for subsequent troubleshooting or other service/maintenance functions when the user is having problems; and (ii) the data from the premises in question can be compared or analyzed in light of similar data from other premises, such as to identify common problems, behaviors, etc.

Returning again to FIG. 3, the access point device 202, DSTB/gateway/PC, or network entity compares the information contained in the table(s) to determine an optimal location (step 314). In one embodiment, the comparison may include analysis of both the upstream and downstream data flow for transmitting and receiving information. In another variant, the user provided ranking or allocation associated with each location (such as by estimated and/or actual use of the client device 210 at the location) may be used to weight the received data. Specifically, in one variant, the collected data at a user-designated "heavy use" location is given more weight in the analysis of optimal location (i.e., the heavy use location will be optimized preferentially, or even to the detriment in extreme cases, of other locations).

The most optimal location to place the access point device 202 within the premises is in one implementation determined via an optimal path algorithm. The algorithm in one embodiment uses the physical link rates for both the upstream and downstream data flow for transmitting and receiving information between the client devices 210 and the access point device 202. The location with the "best" upstream and downstream of data flow is designated as the "optimal" location. In one variant, the downstream data flow can be weighted (e.g., weighted more heavily) depending on the service type reliance, such as where downstream traffic from the AP to the client devices is more critical or a more prevalent use case.

The most optimal location to place the access point device 202 within the premises is in another implementation determined via a simple weighted scoring algorithm. Specifically, the weights associated with each location are multiplied by the performance data for that location for each of the clients (either individually, or in the aggregate) where multiple clients are tested at the same location, and a net "score" developed for each location. The location with the highest score is designated as the "optimal" location.

So, as a very simple example of the foregoing, a premises with three (3) locations where a first location is weighted at 45%, and the use of the other locations at 35% and 20% respectively, might be analyzed as follows:

TABLE 2

| Location | Weight (use %) | Measured RF Signal Level (1-10) | Score |
|---|---|---|---|
| Office | 45 | 6 (Bedroom) | 2.7 |
|  |  | 9 (Kitchen) | 4.05 |
|  |  | 10 (Office) | 4.5 |
| Bedroom | 35 | 6 (Office) | 2.1 |
|  |  | 8 (Kitchen) | 2.8 |
|  |  | 10 (Bedroom) | 3.5 |

TABLE 2-continued

| Location | Weight (use %) | Measured RF Signal Level (1-10) | Score |
|---|---|---|---|
| Kitchen | 20 | 9 (Office) | 1.8 |
|  |  | 8 (Bedroom) | 1.6 |
|  |  | 10 (Kitchen) | 2.0 |

Hence, the data in Table 2 shows that the link (AP location) which provides the best overall performance is that with the highest aggregated score, and is hence "optimal". Specifically, in this example, placing the AP in the Office scores an aggregate value of 8.4, in the Bedroom scores 7.8, and the Kitchen 8.85, thereby indicating that the Kitchen is the "optimal" place to locate the AP. Note that (i) use of a wireless client device in the same location as the AP is presumed to have highest possible performance (i.e., a "10" on this exemplary rating scale) for sake of simplicity, and (ii) links are assumed to be fully symmetric in terms of directionality.

Table 3 below illustrates another example with the same assumptions and rooms of the premises, yet where greater disparity between link performance exists:

TABLE 3

| Location | Weight (use %) | Measured RF Signal Level (1-10) | Score |
|---|---|---|---|
| Office | 45 | 3 (Bedroom) | 1.35 |
|  |  | 2 (Kitchen) | 0.9 |
|  |  | 10 (Office) | 4.5 |
| Bedroom | 35 | 3 (Office) | 1.05 |
|  |  | 8 (Kitchen) | 2.8 |
|  |  | 10 (Bedroom) | 3.5 |
| Kitchen | 20 | 2 (Office) | 0.4 |
|  |  | 8 (Bedroom) | 1.6 |
|  |  | 10 (Kitchen) | 2.0 |

In this example the Office scores an aggregated value of 5.95, the Bedroom 6.45, and the Kitchen 5.7. So, in this example, the AP is best placed in the Bedroom, the difference in result from the example of Table 2 being due to the different link performances.

In one variant, the software application (whether disposed on client, DSTB/gateway/PC, or other) gives the user the opportunity to view the tables and to affirm a correctly identified location (i.e., one associated with a given client device placement), and/or manually select a correct location in the instance the identified location is incorrect (e.g., the "Office" is erroneously identified as the "Kitchen"). Additionally, the premises network 200 may be configured to tag locations and/or "learn" locations as entered by a user. In other words, at the time a user manually enters a location the premises network 200 may be configured to use the previously received information (from the location request and/or the ping response) or may ping the client devices 210 and use information extracted from the client device 210 to override any previously stored location profile information for the user-entered location.

The application may also optionally be configured to allow the user to model, re-optimize, or "iterate" various configurations, such as by inserting different weighting factors or operational conditions for each location. For instance, a user could perform a sensitivity analysis based on weighting; e.g., "does the choice of where to place the AP change when I weight the Office use differently?" As another example, the user might make link quality measurements in the kitchen with the microwave oven (which operates at a nominal 2.4 GHz, similar to that of Wi-Fi lower band and Bluetooth frequency) both on and off, so as to see the potential impact of placing the AP in the kitchen close to the microwave. Similar logic applies to any cellular femtocells, repeaters, or a secondary access point, such as a MoCA-to-Wi-Fi Bridge, which may be placed at the premises.

After, the collected data has been analyzed (via whatever device/entity), a particular one of the locations is identified per step 314 as the optimal location (i.e., the location within the premises for which the "best" communication to all of the client devices 210 is determined). The determination specifies a particular location within the user premises and/or identifies the particular client device 210 (and a location thereof) at which the access point should be placed. As noted above, such information can be communicated to the user graphically (e.g., via an on-screen map or listing of locations, with the placement location being highlighted or otherwise denoted), verbally (such as communication with a remote network operator), or via any other means available. It will be appreciated that such communication to the user effectively obviates the need for any specialized installer or "truck roll", thereby reducing installation latency and cost, and increasing user experience and satisfaction.

In addition, the second and third most optimal locations for the access point device 202 are also known from the connectivity table/application, and these locations may be used when the optimal (first) location is not practicable. The second and/or third optimal locations may be further utilized for placement of additional access points within the premises (as discussed with respect to FIG. 2b and in greater detail below).

The user may then install the access point device 202 at the location of the client device 210 which was determined to be the optimal location (or a location proximate to the optimal location). The access point device 202, in one embodiment, runs a test after installation (e.g., upon initial provisioning) by collecting connectivity data from the client devices 210 at the various locations. This data is compared to the previously collected data (e.g., from the client device 210 which acted as an access point at this same location previously). Results of this test may be reported to the network 101 for, inter cilia, back-end monitoring and premises characterization purposes, and to provide a "snap-shot" of the most optimal location which can be compared to subsequently obtained data to determine if there are any degradation or other "shifts" in link performance over time for that AP installation location.

In one variant, it may be determined by the analysis (e.g., software application, or even human analysis) that one single location would not suffice to provide optimal or suitable coverage for all the client devices 210 within the premises. The user may be notified that a single access point is not recommended in this instance, however the user may still be provided with a single access point location determination.

Alternatively, more than one optimal location can be identified (i.e., the devices which together provide the best coverage for all of the client devices 210 in the premises); see again FIG. 2b. The placement of the two (or more) APs 202a, 202b may be accomplished in any number of different ways. For example, in one variant, the first and second choices for "best" or optimal location generated by the software application (discussed supra) are chosen for the placement of the first and second APs 202a, 202b, respectively, wherein all the client devices are simultaneously placed in the premises, and iteratively used as ad hoc AP as in the process of FIG. 3. Alternatively, the evaluation can be conducted by dividing the client devices 210 into two or more smaller groups or clusters, and then determining an optimal location for each of the smaller groups, such as where different use cases or scenarios are envisaged. For example, the client devices 210 can be divided into 2.4 GHz and 5 GHz groupings. The most optimal location to place two (or more) APs 202a, 202b within the premises is determined for each grouping via an optimal path algorithm. For two groups at the same frequency, the solution for second AP 202b depends on the position solution for the first AP 202a. In one embodiment, the group at the same frequency is divided into two or more sub-groups by physical location. In this embodiment, when determining the optimal location, a first sub-group is turned off, and an optimal location for a second sub-group is determined as described elsewhere herein. Once, the second sub-group has completed determining the optimal location for the second sub-group, an optimal location for the first sub-group is determined as described elsewhere herein. The optimal location and information obtained in determining the optimal location for each of the sub-groups can then be used in conjunction with the optimal location of the other groups to determine the location to place two (or More) APs 202a, 202b within the premises. In one variant, a user may want highest available bandwidth for their tablet in the Bedroom in a first use case (thereby requiring servicing of the tablet at that location with a first AP), but in fact uses the tablet very little if ever in other parts of the house thereby "de-prioritizing" it with respect to the second AP. Yet other approaches for "optimally" placing the two or more APs 202A, 202b based on client device-originated link data will be appreciated by those of skill in the related arts given the present disclosure.

In another embodiment, after the access point device 202 has been installed, error rate information (e.g., BER, PER) may be obtained while data is being delivered to the client devices 210 by the access point device 202. Generally, error rate information is used to determine whether a change in coding scheme is necessary in order to more effectively provide data services to the client devices 210 (e.g., within the PHY of the WLAN link). However, in the exemplary embodiment of the present disclosure, the error rate information may be further used to determine that the current optimal location for the access point device 202 is no longer optimal. Error rate statistics over time may be correlated to a location, so as to e.g., alert the user or network operator of a degradation of link quality (such as due to installation of an interferer on the premises or a nearby premises), thereby prompting a re-evaluation and possible AP re-location in order to optimize user experience and performance. Changes in link performance may be very insidious, and go unnoticed by the user for a long period of time without the periodic monitoring/corrective functionality described herein.

Exemplary Access Point Device—

Figure 5:
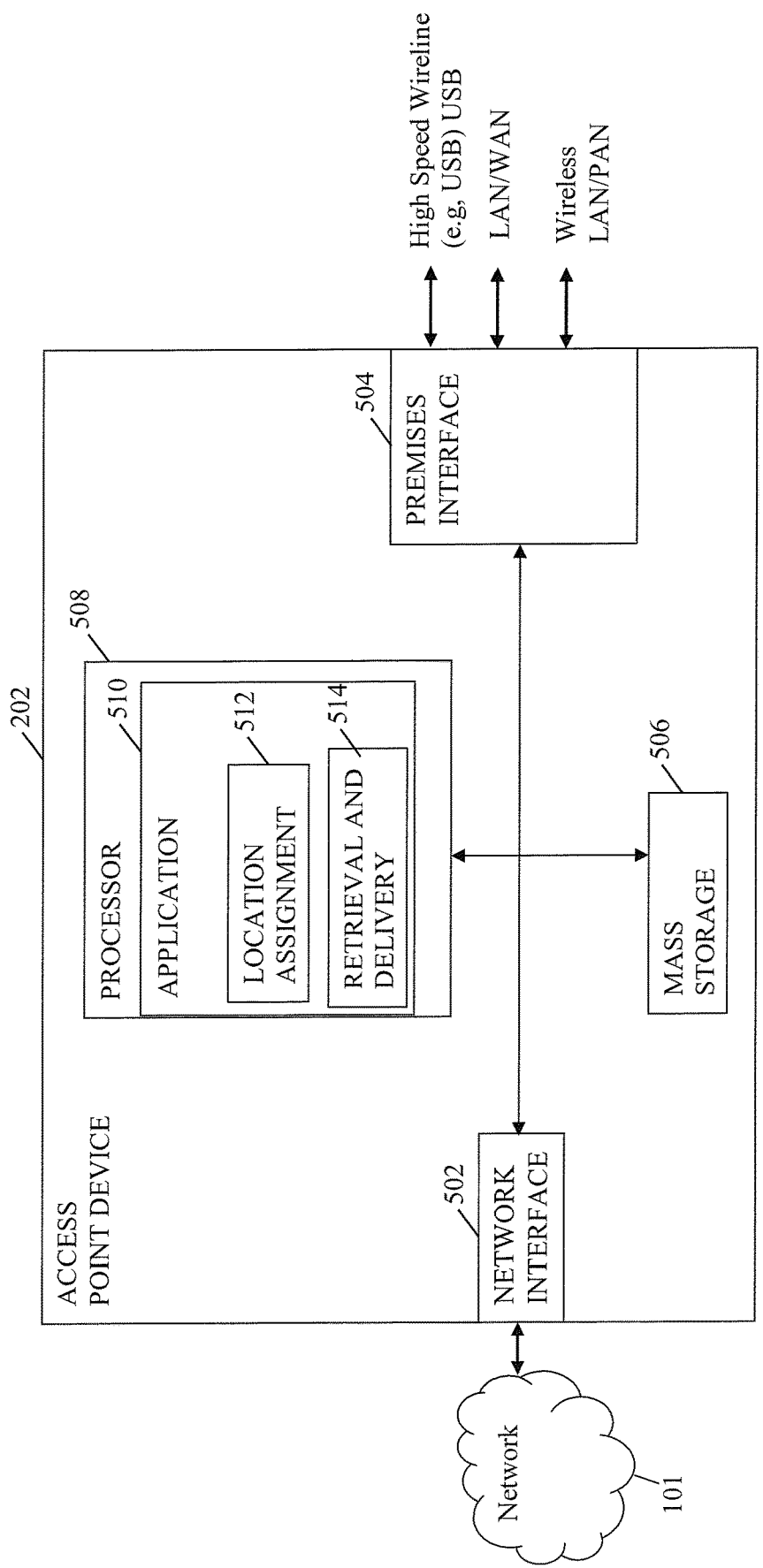
FIG. 5 is a block diagram illustrating an exemplary embodiment of an access point device for use in accordance with various aspects of the present disclosure.

FIG. 5 is a block diagram illustrating an exemplary embodiment of the access point device 202 configured for use in providing wireless access to the client devices 210 within the premises. As shown, the access point device 202 generally comprises a network interface 502, a premises interface 504, a processor 508, and an associated storage device 506. In the illustrated embodiment, the processor 508 is configured to run at least one application 510 thereon. The application 510 comprises a location assignment module 512, and a retrieval and delivery module 514, although other software/logic architectures may readily be substituted.

In the previously described embodiment, wherein the access point device 202 is configured to generate a plurality of location profiles, the application 510 further comprises a software module configured to generate these individual profiles. Alternatively, the client devices 210 create the location profiles themselves and transmit these to the access point device 202. The location profiles may comprise information which is used for analysis and characterization of a signal. The reported information may include e.g., whether a hot-spot is nearby, error rate information obtained during data delivery, Wi-Fi channel state, RF power/RSSI, delay, signal phase, signal quality, amplification, beamforming data, link quality, channel noise, signal-to-noise ratio (SNR) etc. The location profile may further include a user entered or automatically generated location name, associated to the data collected thereat, or vendor and/or manufacturer and model number of the client device 210, or alternatively device IDs such as a MAC address or the like may be used for device identification of a device which can then be correlated to a location via other means (such as a lookup table).

The location assignment module 512 is in one embodiment configured to associate a qualifier (e.g., name) to the locations in the premises. As indicated above, the locations are identified and/or designated by the user. The location assignment application 512 associates the data received at the profile generation application 510 to a particular location across multiple client devices 210. One or more profiles are therefore associated, via the location assignment application 512, to a particular user-determined location. For example, the locations may be assigned qualifiers such as "kitchen", "family room", "dining room". "bedroom", etc. at the user level, while other designations may be used at the device level (e.g., a given location such as the user's office is "001" for all devices accessing the data).

The retrieval and delivery software module 514 is configured to retrieve stored information regarding the location of the client devices 210 (such as by performing a query of a storage entity). The retrieval and delivery module 514 may be used in the instance the information is not pushed to the access point device 202 (or pulled by the access point device 202) directly from the client devices 210.

One or more additional applications or modules may be provided to, inter cilia, enable a user to manually correct an incorrectly identified device location, and subsequently store an updated device profile and location assignment. Additionally, applications or modules may be provided to enable the access point device 202 to "learn" locations as entered by a user. For example, at the time a user manually enters a location name or designation, the application may be configured cause the client device 210 to be pinged, and subsequently use information extracted from the most recent device response message to override any previously stored profile information for the user-entered location.

A network interface 502 and a premises interface 504 are further illustrated as part of the exemplary AP. The network interface 502 is in one embodiment configured to provide content and data delivery to and from the network 101, and may comprise for example a DOCSIS modem interface, HFC "in band" RF interface, DSL (e.g., copper telephony and modem) interface, optical fiber interface, wireless satellite (e.g., DSS) interface, WiMAX interface, or yet others.

The premises interface 504 provides communication between the access point device 202 and various client devices 210 within a premises. For example, the premises interface 504 enables communication of client ping messages, as well as receipt of response messages and location requests. Communication between the client devices 210 and premises interface 504 may occur via a wired or wireless communication therewith, such as via e.g., IEEE-1394 (so called "FireWire"), USB, LAN/WAN, Wireless, etc. communications. In one exemplary configuration, a WLAN (Wi-Fi) interface is used both as the data carrier (between AP and client) and the interface being evaluated for RSSI/link quality, such as where a given client device, acting as ad hoc AP, evaluates the RF link between itself and another client device, and also uses that link to communicate the data and or evaluation results obtained via the software application.

It will be appreciated that the access point may also be combined with other functions and/or form factors, such as existing premises components such as wireless routers, gateways, computers, settop boxes (e.g., DSTBs), and the like.

Exemplary Client Device—

Figure 6:
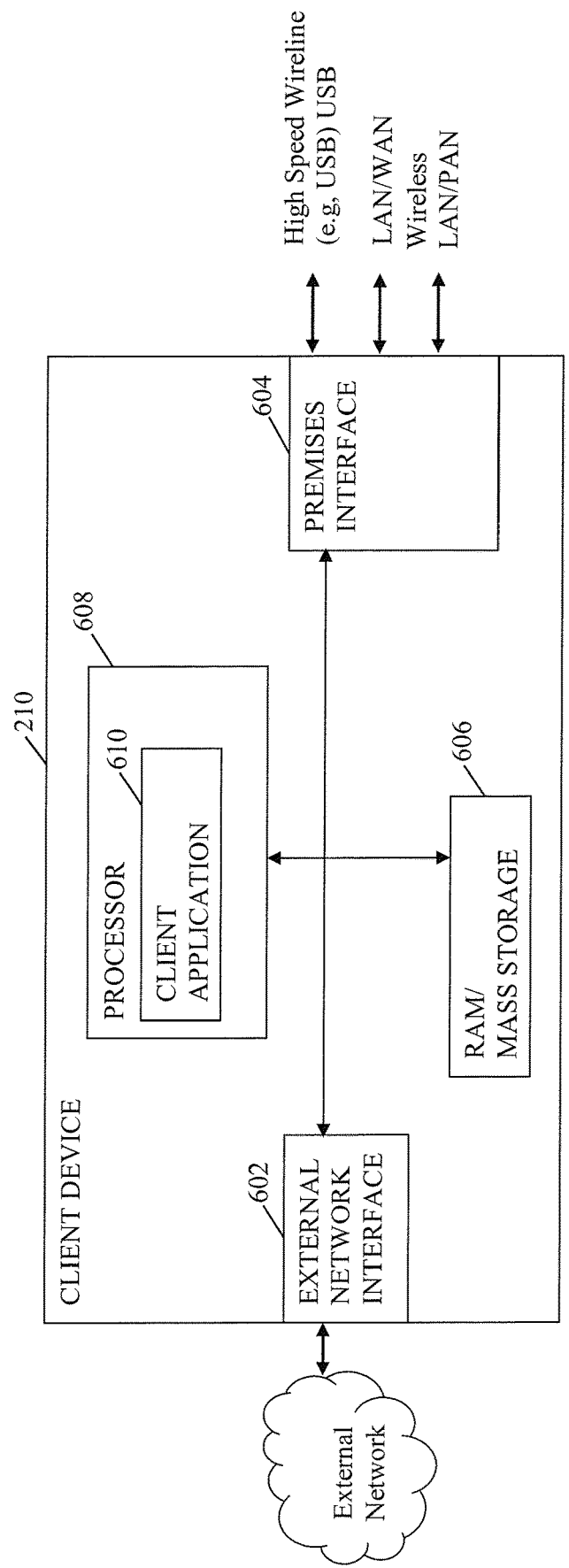
FIG. 6 is a block diagram illustrating an exemplary embodiment of a client device for use in accordance with various aspects of the present disclosure.

FIG. 6 is a block diagram illustrating an exemplary embodiment of a client device 210 for use in providing location identification services within a premises. As shown, the device generally comprises an external network interface 602, premises interface 604, a processor 608 and associated storage 606 (discussed in greater detail below). It will be appreciated that while described somewhat generically herein, the individual client devices may both (i) be heterogeneous or homogeneous in nature/capability; and (ii) be integrated into or make use of extant devices/form factors such as smartphones, tablets, phablets, laptops, handhelds, gaming devices, wireless routers, etc.

The external network interface 602 (if present) provides, inter alia, content and data delivery to and from an external network, such as a cellular network, WiMAX network, etc. For instance, the client device 210 may comprise a cellular or WIMAX enabled smartphone, which can communicate independently of its premises interface (e.g., WLAN).

The premises interface 604 provides inter alia, communication between the client device 210 and various devices within a premises, such as e.g., other client devices 210, and the access point device(s) 202. For example, the premises interface 604 in one variant comprises an 801.11 compliant interface that enables gathering of and optionally transmission/receipt of, connectivity data relating to one or more of the other client devices 210, as well as transmission of the table of link statistics to the access point device 202 via e.g. IEEE-1394, USB, wired LAN/WAN, Wireless, Wi-Fi, etc.

In the illustrated embodiment, the processor 608 is configured to run a software application (e.g., the user-downloaded application previously described) 610 thereon. The user downloaded client application 610 is configured to enable a user to gather and receive/send link statistics information as well as information identifying the client device 210 from which they were received (such as via an embedded identifier or other such identifying information within the signal). In this fashion, each client device 210 running the application can, if desired, both provide the data it gathers relating to link quality to other clients (and/or the AP 202), as well as acting as a recipient and analyzer of the data from other clients (as well as its own). Hence, when the exemplary application is installed on all the user's client devices 210, the user need not worry about which client goes first, last, etc.; any of the clients can aggregate the data and either analyze it in situ, or forward it to another entity (client, gateway/DSTB/PC, network entity, etc.) for evaluation and/or storage. However, it will further be appreciated that use of heterogeneous client applications may be used consistent with the disclosure if desired; e.g., so as to designate a "master" client device, or achieve other goals afforded by such heterogeneous software (such as use of very "thin" software on minimal capability devices).

Specifically, in a first embodiment, the client application 610 causes the received link statistics to be re-transmitted to the access point device 202 without modification thereof (i.e., acts as a repeater). Alternatively, this data may be transmitted to a storage entity 204, or to another client device 210 or entity within the network. A Wi-Fi premises interface 604 or other air interface (e.g., Bluetooth, UWB, etc.) may be utilized for wirelessly communicating the link statistics. It is appreciated, however, that the premises interface 604 and/or communication with the access point device 202 may occur via any number of wired and/or wireless communications modalities of the type previously set forth herein.

In another embodiment, the client application 610 may be further configured to enable the client device 210 to analyze collected data in order to determine an optimal location for placement of the access point 202 within the premises according the methods disclosed herein. According to this embodiment, data may be received at e.g., the premises interface 604 via communication with the other client devices 210 in the premises. The data is stored (e.g., in RAM 606 or a mass storage device such as flash memory or HDD) for the aforementioned analysis and storage of results.

It will be recognized that while certain aspects of the present disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the ideas set forth herein. The foregoing description is of the best mode presently contemplated of carrying out the disclosure. This description is in no way meant to be limiting, but rather should be taken as illustrative of the general principles of. The scope of the disclosure should be determined with reference to the claims.

What is claimed is:

1. A computerized method of determining an optimized installation configuration to install a wireless access point within a user premises, said computerized method comprising:

configuring at least one computer program application operative to run on at least one of a plurality of wireless-enabled computerized client devices, said plurality of wireless-enabled computerized client devices disposed in respective ones of a plurality of locations within said user premises;

causing, by said at least one computer program application, each of said plurality of wireless-enabled computerized client devices to: (i) exchange signals between one another as part of an iterative process, and (ii) collect data relating to one or more radio frequency characteristics at respective ones of said plurality of locations;

receiving, by said at least one computer program application, said collected data;

utilizing at least said collected data to generate a plurality of profiles associated with said plurality of wireless-enabled computerized client devices, respectively, wherein said plurality of profiles comprise a plurality of respective antenna signatures associated with said plurality of wireless-enabled computerized client devices;

utilizing said plurality of respective antenna signatures to associate said one or more radio frequency characteristics of said plurality of wireless-enabled computerized client devices to said plurality of locations;

determining, via use of said plurality of profiles, said optimized installation configuration; and displaying, via at least one computerized graphical user interface, information relating to said optimized installation configuration to a user;

wherein said iterative process comprises:
    enabling a mode that allows an individual one of said plurality of wireless-enabled computerized client devices to act as an ad hoc access point;
    receiving, by said individual one of said plurality of wireless-enabled computerized client devices, said data from one or more available other ones of said plurality of wireless-enabled computerized client devices;
    disabling said mode to cause said individual one of said plurality of wireless-enabled computerized client devices to stop acting as said ad hoc access point; and
    enabling said mode for another individual one of said plurality of wireless-enabled computerized client devices to act as said ad hoc access point.

2. A computerized method of determining an optimized placement of a wireless access point at a premises, said computerized method comprising:

causing a plurality of wireless-enabled computerized devices to transmit and receive signals in a prescribed sequence in order to characterize: (i) at least one of movement or predictable pathways within said premises, and (ii) a performance of each of a plurality of wireless links between said plurality of wireless-enabled computerized devices;

wherein said characterization of said at least one of said movement or said predictable pathways within said premises comprises: (i) generating a plurality of location profile data structures, said plurality of location profile data structures associated with respective ones of a plurality of locations within said premises where said plurality of wireless links are disposed, and (ii) initiating said prescribed sequence based on a movement of at least one of the plurality of wireless-enabled computerized devices;

displaying information relating to said plurality of location profile data structures to at least one user of said premises, said displaying comprising enabling said at least one user to provide input to prioritize said plurality of locations based on a relative importance for each of said plurality of locations to said at least one user; and determining, based at least in part on said prioritization and said characterizations of said performance of said plurality of wireless links, a configuration comprising one or more of said plurality of locations where said performance of said plurality of wireless links is optimized when considered in an aggregate;

wherein said causing said plurality of wireless-enabled computerized devices to transmit and receive signals in said prescribed sequence comprises causing at least:

(i) a first one of said plurality of wireless-enabled computerized devices to radiate radio frequency signals, and a second one of said plurality of wireless-enabled computerized devices to receive said radio frequency signals radiated from said first one of said plurality of wireless-enabled computerized devices; and (ii) said second one of said plurality of wireless-enabled computerized devices to radiate radio frequency signals, and a third one of said plurality of wireless-enabled computerized devices to receive said radio frequency signals radiated from said second one of said plurality of wireless-enabled computerized devices.

3. The computerized method of claim 2, wherein said characterizations relate to one or more radio frequency characteristics comprising data relating to received wireless signal strength or intensity as received at one of said plurality of wireless enabled computerized devices.

4. The computerized method of claim 2, further comprising transmitting information relating to said configuration to a user, said information enabling said user to place a wireless access point within said premises at a location within the premises.

5. The computerized method of claim 1, further comprising:
    generating one or more location profiles for each of said plurality of locations, said generating based at least on said data collected from each of said plurality of wireless-enabled computerized client devices;
    enabling a user of said user premises to provide input to prioritize said one or more location profiles based at least in part on use of said plurality of wireless-enabled computerized client devices respectively disposed at said plurality of said locations; and
    determining said optimized configuration based at least in part on said collected data and said prioritization.

6. The computerized method of claim 2, further comprising enabling, via said displaying, said at least one user to assign data relating to a plurality of respective qualifiers to said plurality of location profile data structures.

7. The computerized method of claim 1, wherein said plurality of respective antenna signatures are further utilized to predict one or more pathways of said plurality of wireless-enabled computerized client devices with respect to said plurality of locations.

8. A computer readable apparatus comprising a non-transitory storage medium, the non-transitory storage medium comprising at least one computer program having a plurality of instructions, the plurality of instructions configured to, when executed on a processing apparatus, cause a computerized process to:

receive data collected by each of a plurality of wireless-enabled computerized client devices, the collected data relating to one or more radio frequency characteristics at respective ones of a plurality of locations within a user premises;

utilize the collected data to generate data representative of a plurality of profiles associated with the plurality of wireless-enabled computerized client devices, respectively, wherein the plurality of profiles comprise a plurality of respective antenna signatures associated with the plurality of wireless-enabled computerized client devices;

utilize the plurality of respective antenna signatures to associate the one or more radio frequency characteristics of the respective plurality of wireless-enabled computerized client devices to the respective plurality of locations;

determine, via use of at least the data representative of the plurality of profiles, an optimized installation configuration for use of a wireless access point within the user premises; and cause display, via at least one computerized graphical user interface, of information relating to the optimized installation configuration to a user at least one of the plurality of wireless-enabled computerized client devices.

9. The computer readable apparatus of claim 8, wherein the plurality of instructions are further configured to, when executed on the processing apparatus, cause the computerized process to:

cause at least a portion of the plurality of wireless-enabled computerized client devices to exchange signals between one another as part of an iterative process.

10. The computer readable apparatus of claim 9, wherein the iterative process comprises:

enablement of a mode that allows an individual one of the plurality of wireless-enabled computerized client devices to act as an ad hoc access point;

receipt, by the individual one of the plurality of wireless-enabled computerized client devices, the data relating to the one or more radio frequency characteristics from one or more other ones of the plurality of wireless-enabled computerized client devices;

disablement of the mode to cause the individual one of the plurality of wireless-enabled computerized client devices to stop acting as the ad hoc access point; and enablement of the mode for another individual one of the plurality of wireless-enabled computerized client devices to act as the ad hoc access point.

11. The computer readable apparatus of claim 8, wherein the plurality of instructions are further configured to, when executed on the processing apparatus, cause the computerized process to associate each of the plurality of locations with one or more weighted values; and wherein:

the collected data comprises performance data; and the determination of the optimized installation configuration comprises an evaluation of the performance data to determine an optimized location, the evaluation comprising use of the one or more weighted values associated with each one of the plurality of locations in conjunction with respective ones of the performance data for each such one of the plurality of locations, to determine a plurality of respective scores, the optimized location comprising a location of the plurality of locations having a highest score within the plurality of respective scores.

12. The computer readable apparatus of claim 8, wherein the wireless access point and the plurality of wireless-enabled computerized client devices are each compliant with an Institute of Electrical and Electronics Engineers (IEEE)-802.11 Wi-Fi standard.

13. The computer readable apparatus of claim 8, wherein the receipt of the collected data comprises aggregation of the collected data from each of the plurality of wireless-enabled computerized client devices, the aggregated data comprising data relating to received wireless signal strength or intensity as measured for each of the plurality of locations by the respective ones of the plurality of wireless-enabled computerized client devices.

14. The computer readable apparatus of claim 8, wherein the receipt of the collected data comprises aggregation of the collected data from each of the plurality of wireless-enabled computerized client devices; and the plurality of instructions are further configured to, when executed on the processing apparatus, cause the computerized process to transmit the aggregated data to a data processing entity, the data processing entity configured to utilize at least the aggregated data to generate a data structure, the data structure comprising link statistics associated with the plurality of locations.

15. The computer readable apparatus of claim 14, wherein:

the data processing entity comprises a second wireless access point;

one of the plurality of wireless-enabled computerized client devices comprises a computerized client device acting as an ad-hoc access point; and the computerized client device acting as the ad-hoc access point ceases acting as the ad-hoc access point based on an inability of the computerized client device acting as the ad-hoc access point to establish or maintain data connection with at least one other one of the plurality of wireless-enabled computerized client devices.

16. The computer readable apparatus of claim 8, wherein:

one of the plurality of wireless-enabled computerized client devices comprises a computerized client device acting as an ad-hoc access point;

the plurality of instructions are further configured to, when executed on the processing apparatus, cause the computerized process to:

transmit a signal to the computerized client device acting as the ad-hoc access point based at least on a minimum threshold not being met;

the determination of the optimized installation configuration comprises an evaluation of the collected data to determine an optimized location, the evaluation the collected data to comprising a determination of whether the minimum threshold is met, the minimum threshold relating to wireless signal strength or intensity for data communications at a respective one of the plurality of locations where the computerized client device acting as the ad-hoc access point is disposed; and the transmitted signal is configured to cause the computerized client device acting as the ad-hoc access point to: (i) stop acting as the ad-hoc access point, and (ii) signal another one of the plurality of wireless-enabled computerized client devices to start acting as the ad-hoc access point.

17. A computer readable apparatus comprising a non-transitory storage medium, the non-transitory storage medium comprising at least one computer program having a plurality of instructions, the plurality of instructions configured to, when executed on a processing apparatus, cause a computerized process to:

cause a plurality of wireless-enabled computerized devices to transmit and receive signals in a prescribed sequence in order to characterize: (i) at least one of movement or predictable pathways within a premises, and (ii) a performance of each of a plurality of wireless links between the plurality of wireless-enabled computerized devices;

wherein the characterization of the movement or the predictable pathways within the premises comprises: (i) a generation of a plurality of location profile data, the plurality of location profile data associated with respective ones of a plurality of locations within the premises where the plurality of wireless links are disposed, and (ii) an initiation of the prescribed sequence based on a movement of at least one of the plurality of wireless-enabled computerized devices; and determine, based at least on the characterizations of (i) the at least one of the movement or the predictable pathways within the premises, and (ii) the performance of each of the plurality of wireless links between the plurality of wireless-enabled computerized devices, a configuration comprising one or more of the plurality of locations where the performance of the plurality of wireless links is optimized when considered in an aggregate.

18. The computer readable apparatus of claim 17, wherein the causation of the plurality of wireless-enabled computerized devices to transmit and receive the signals in the prescribed sequence comprises causation of at least:
(i) a first one of the plurality of wireless-enabled computerized devices to radiate radio frequency signals, and a second one of the plurality of wireless-enabled computerized devices to receive the radio frequency signals radiated from the first one of the plurality of wireless-enabled computerized devices; and
(ii) the second one of the plurality of wireless-enabled computerized devices to radiate radio frequency signals, and a third one of the plurality of wireless-enabled computerized devices to receive the radio frequency signals radiated from the second one of the plurality of wireless-enabled computerized devices.

19. The computer readable apparatus of claim 17, wherein the plurality of instructions are further configured to, when executed on the processing apparatus, cause the computerized process to:
cause display of information relating to the plurality of location profile data to at least one user of the premises, the display comprising enablement of the at least one user to provide input to prioritize the plurality of locations based on a relative importance for each of the plurality of locations to the at least one user; and
wherein determination of the configuration is further based on the prioritization.

20. The computer readable apparatus of claim 17, wherein the characterizations relate to one or more radio frequency characteristics comprising data relating to received wireless signal strength or intensity as received at one of the plurality of wireless-enabled computerized devices.

* * * * *